United States Patent
Ino et al.

(10) Patent No.: US 11,594,895 B2
(45) Date of Patent: Feb. 28, 2023

(54) POWER SUPPLY SYSTEM

(71) Applicant: HONDA MOTOR CO., LTD., Tokyo (JP)

(72) Inventors: Mitsuyasu Ino, Wako (JP); Yasuto Watanabe, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/275,695

(22) PCT Filed: Sep. 13, 2019

(86) PCT No.: PCT/JP2019/036003
§ 371 (c)(1),
(2) Date: Mar. 12, 2021

(87) PCT Pub. No.: WO2020/054828
PCT Pub. Date: Mar. 19, 2020

(65) Prior Publication Data
US 2022/0029428 A1 Jan. 27, 2022

(30) Foreign Application Priority Data
Sep. 13, 2018 (JP) .............................. JP2018-171167

(51) Int. Cl.
*H02J 7/00* (2006.01)
*B60L 50/60* (2019.01)
(Continued)

(52) U.S. Cl.
CPC ............ *H02J 7/0014* (2013.01); *B60L 50/60* (2019.02); *B60L 58/12* (2019.02);
(Continued)

(58) Field of Classification Search
CPC .... H02J 7/0014; H02J 7/0048; H02J 7/00714; H02J 7/007182; H02J 2207/20;
(Continued)

(56) References Cited

U.S. PATENT DOCUMENTS

| | | | |
|---|---|---|---|
| 2004/0138785 A1 | 7/2004 | Emori et al. | |
| 2005/0121979 A1* | 6/2005 | Matsumoto | ........... H02J 7/0024 307/66 |
| 2010/0019569 A1 | 1/2010 | Izumi et al. | |
| 2010/0181829 A1* | 7/2010 | Ichikawa | ............ H01M 10/425 307/9.1 |

(Continued)

FOREIGN PATENT DOCUMENTS

| | | |
|---|---|---|
| EP | 1837944 | 9/2007 |
| JP | 2004-215459 | 7/2004 |

(Continued)

OTHER PUBLICATIONS

International Search Report and Written Opinion for International Application No. PCT/JP2019/036003 dated Nov. 19, 2019, 11 pages.

*Primary Examiner* — Lincoln D Donovan
*Assistant Examiner* — Alex W Lam
(74) *Attorney, Agent, or Firm* — Amin, Turocy & Watson, LLP

(57) ABSTRACT

In a power supply system, a plurality of voltage converters have chargeable/dischargeable batteries connected to the respective primary sides and have respective secondary sides connected in parallel to each other. For each of the voltage converters, a voltage transformation rate is set such that the current measured by a primary side current measuring instrument is maintained within a first range between the discharge current maximum value of the batteries connected to the primary sides and the charge current maximum value of the batteries.

7 Claims, 16 Drawing Sheets

(51) Int. Cl.
*B60L 58/12* (2019.01)
*H01M 10/44* (2006.01)
*H01M 10/48* (2006.01)
*H02M 3/158* (2006.01)

(52) U.S. Cl.
CPC ....... *H01M 10/441* (2013.01); *H01M 10/482* (2013.01); *H02J 7/0048* (2020.01); *H02J 7/00714* (2020.01); *H02J 7/007182* (2020.01); *H01M 2220/20* (2013.01); *H02J 2207/20* (2020.01); *H02M 3/158* (2013.01)

(58) Field of Classification Search
CPC ..... H02J 7/00; H02J 7/04; B60L 50/60; B60L 58/12; B60L 53/00; H01M 10/441; H01M 10/482; H01M 2220/20; H02M 3/158; H02M 3/1584; Y02E 60/10; Y02T 10/70; Y02T 10/7072; Y02T 90/14
See application file for complete search history.

(56) References Cited

U.S. PATENT DOCUMENTS

| | | | | |
|---|---|---|---|---|
| 2012/0032505 | A1* | 2/2012 | Kusumi | B60L 58/18 307/10.1 |
| 2019/0334442 | A1* | 10/2019 | Iyasu | H02M 3/33507 |

FOREIGN PATENT DOCUMENTS

| | | |
|---|---|---|
| JP | 2007-259612 | 10/2007 |
| JP | 4318123 | 8/2009 |
| JP | 4525809 | 8/2010 |
| JP | 2013-070441 | 4/2013 |
| JP | 5287983 | 9/2013 |
| JP | 2015-192462 | 11/2015 |
| JP | 2016-082767 | 5/2016 |
| JP | 2016-208570 | 12/2016 |
| JP | 6247039 | 12/2017 |
| JP | 6293010 | 3/2018 |

* cited by examiner

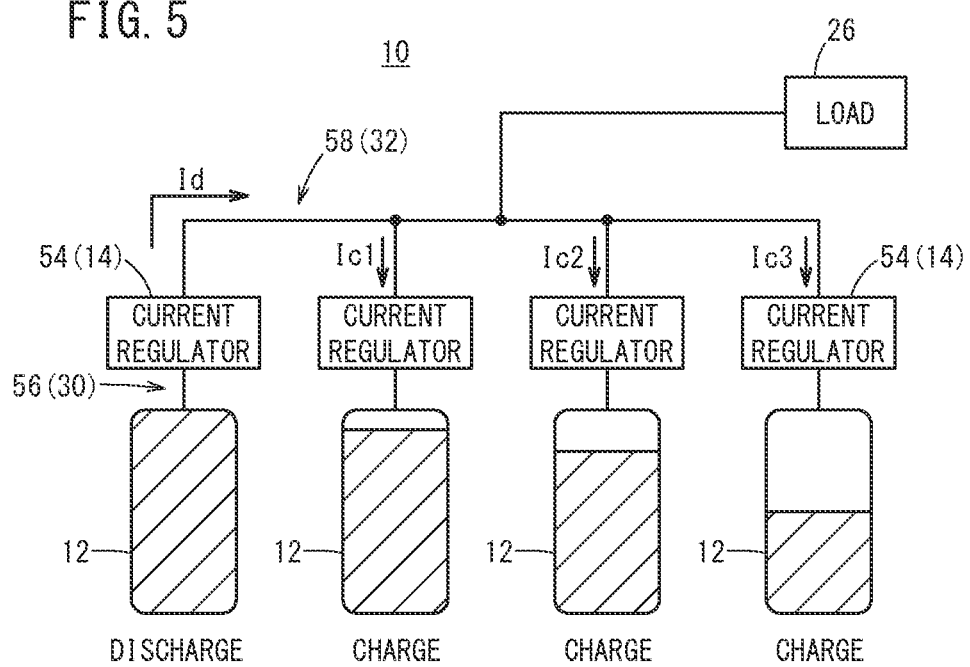

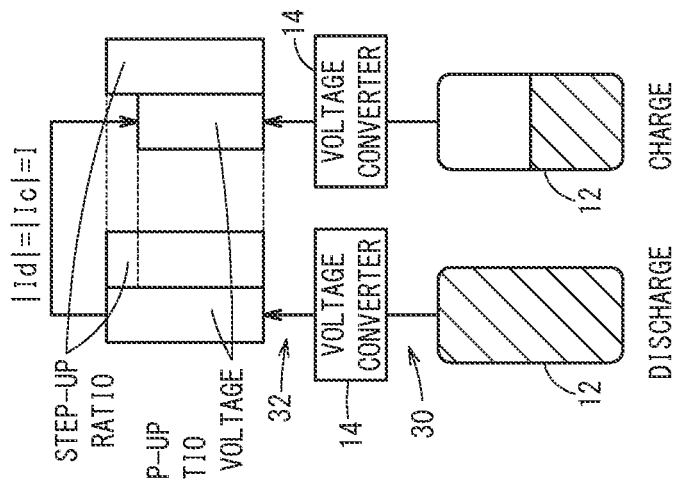
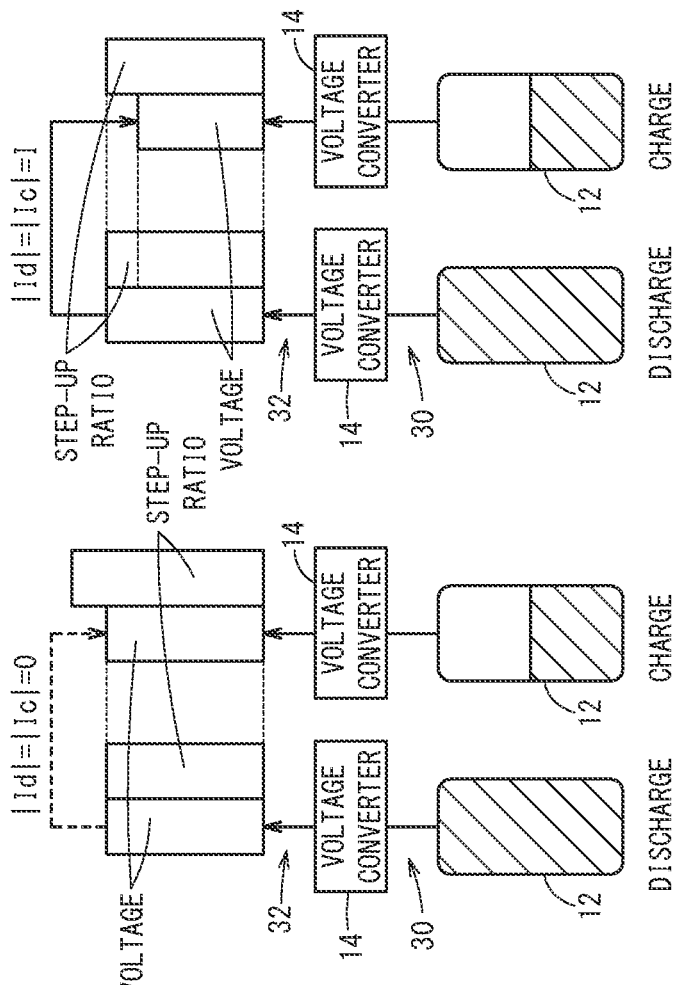
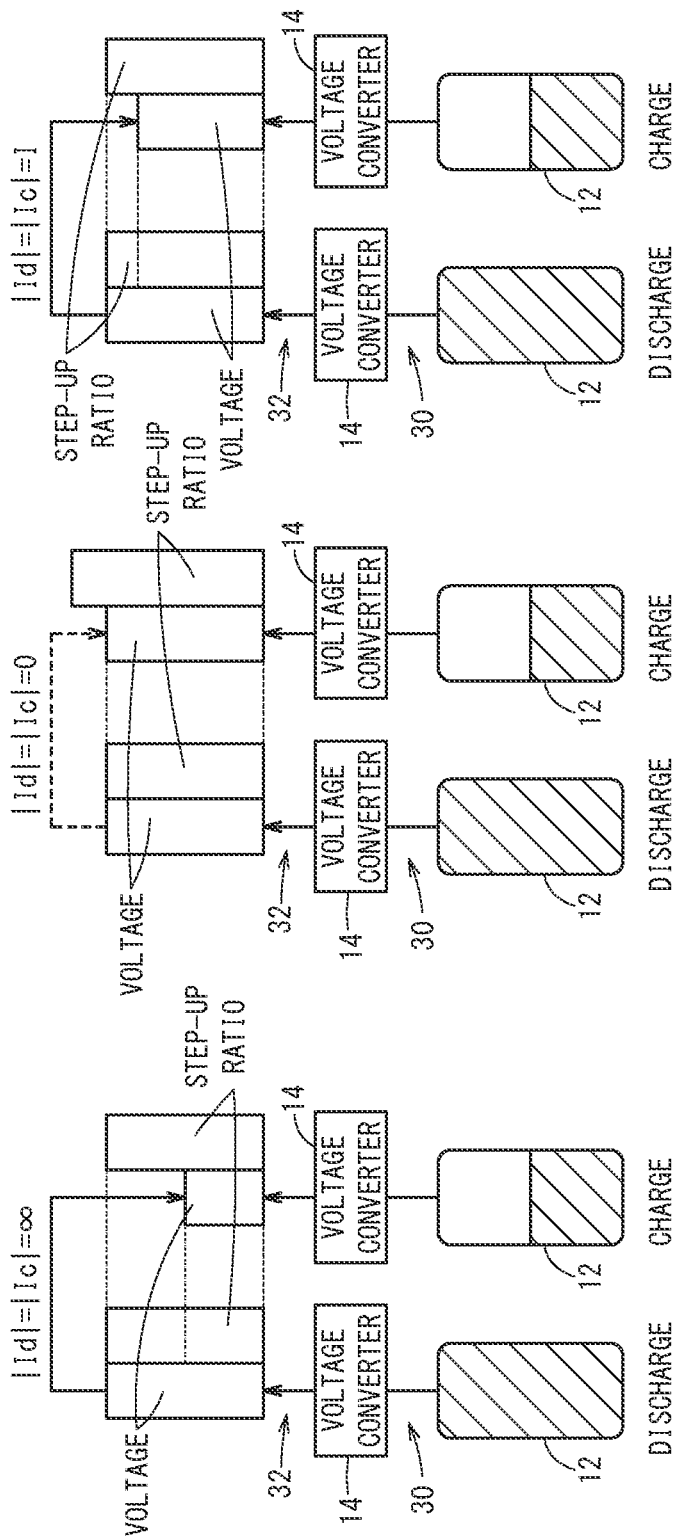

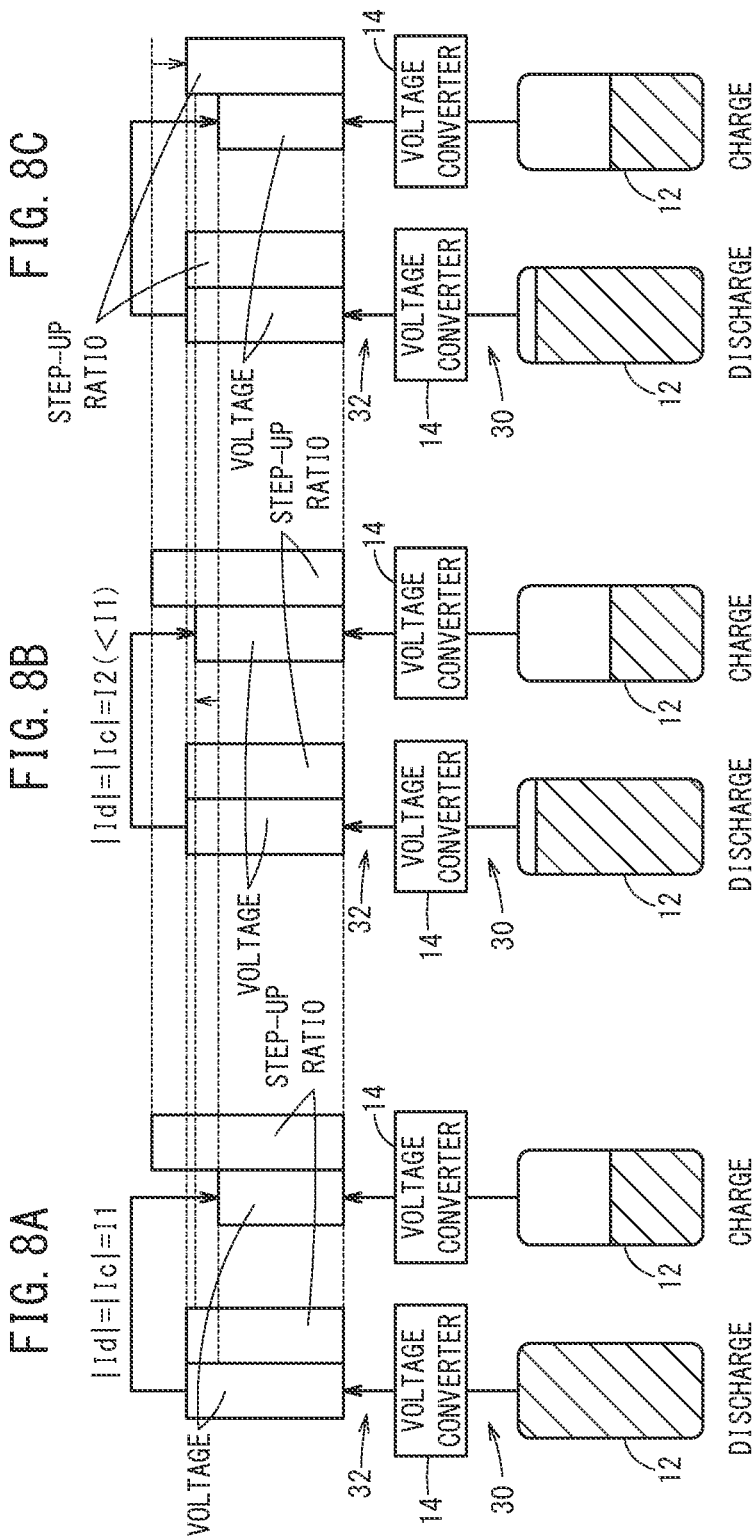

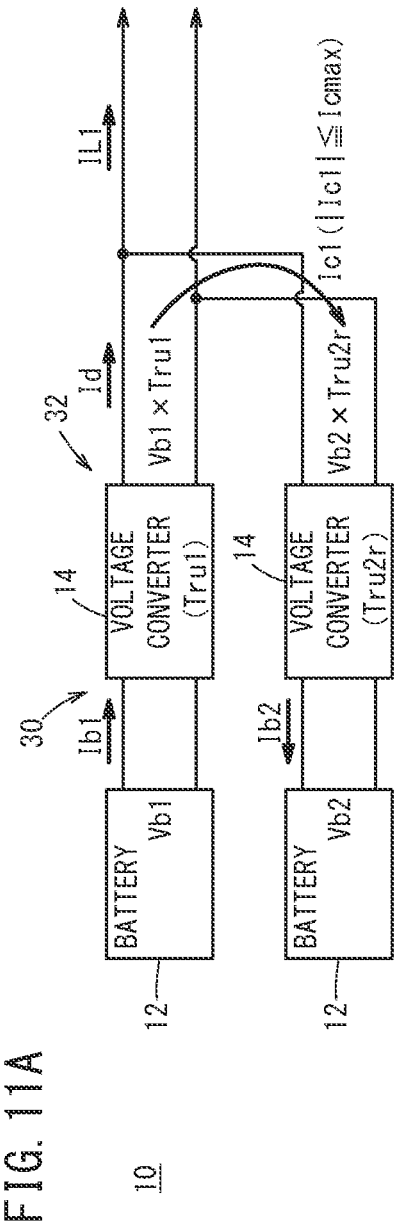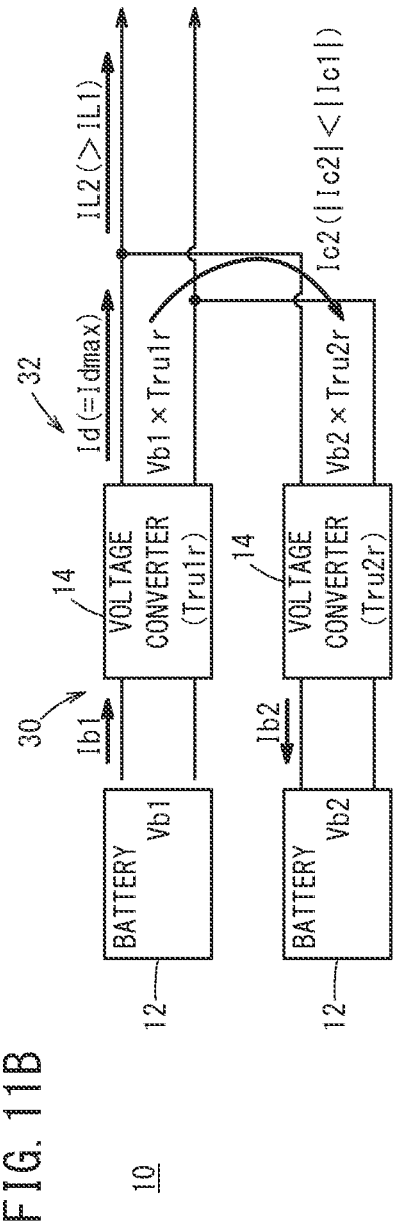

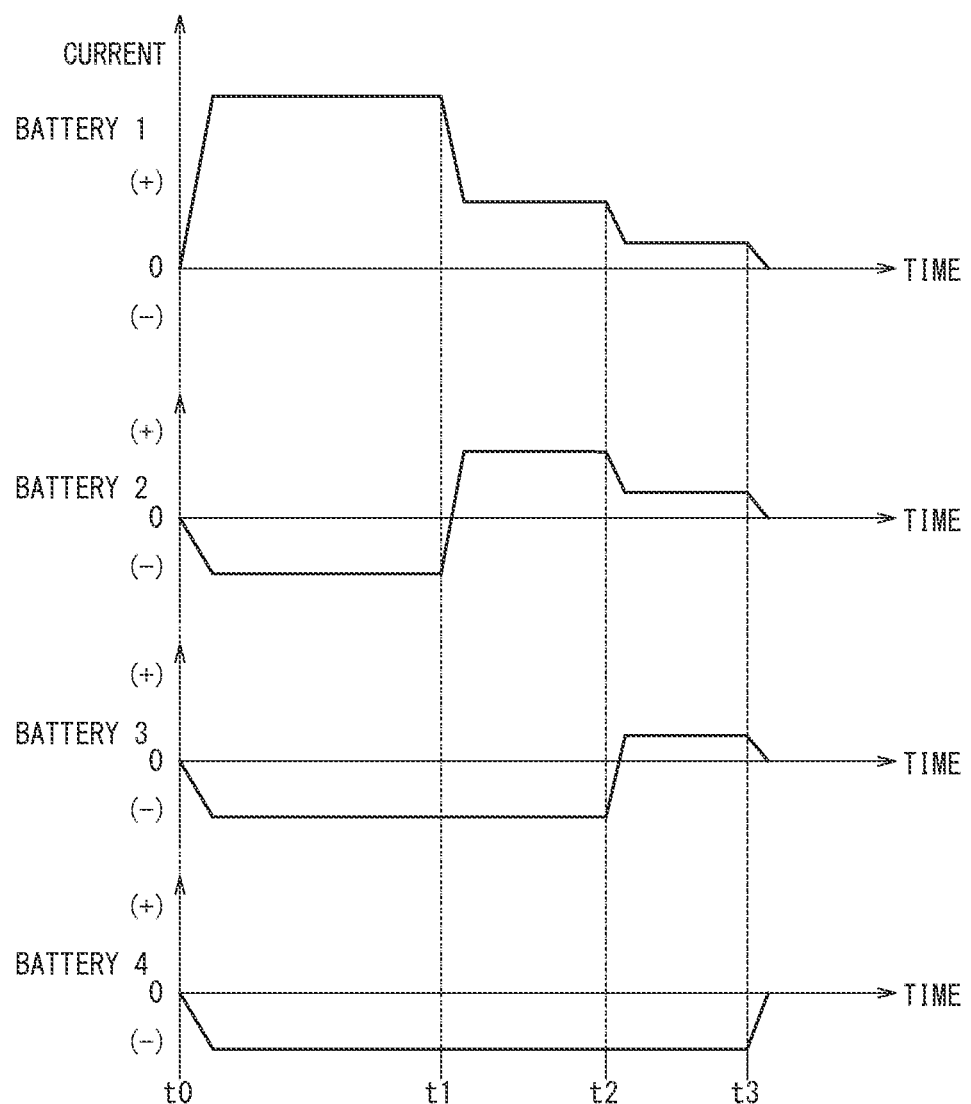

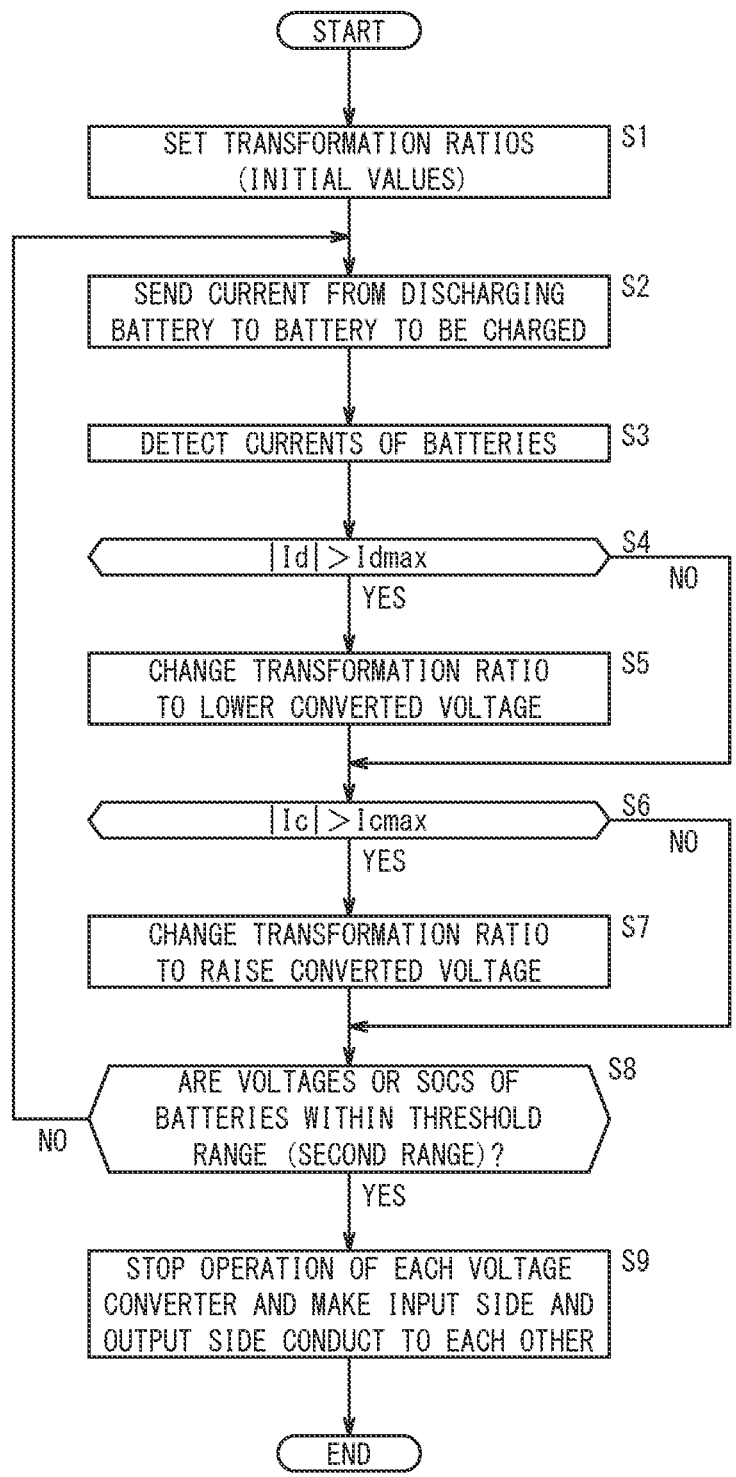

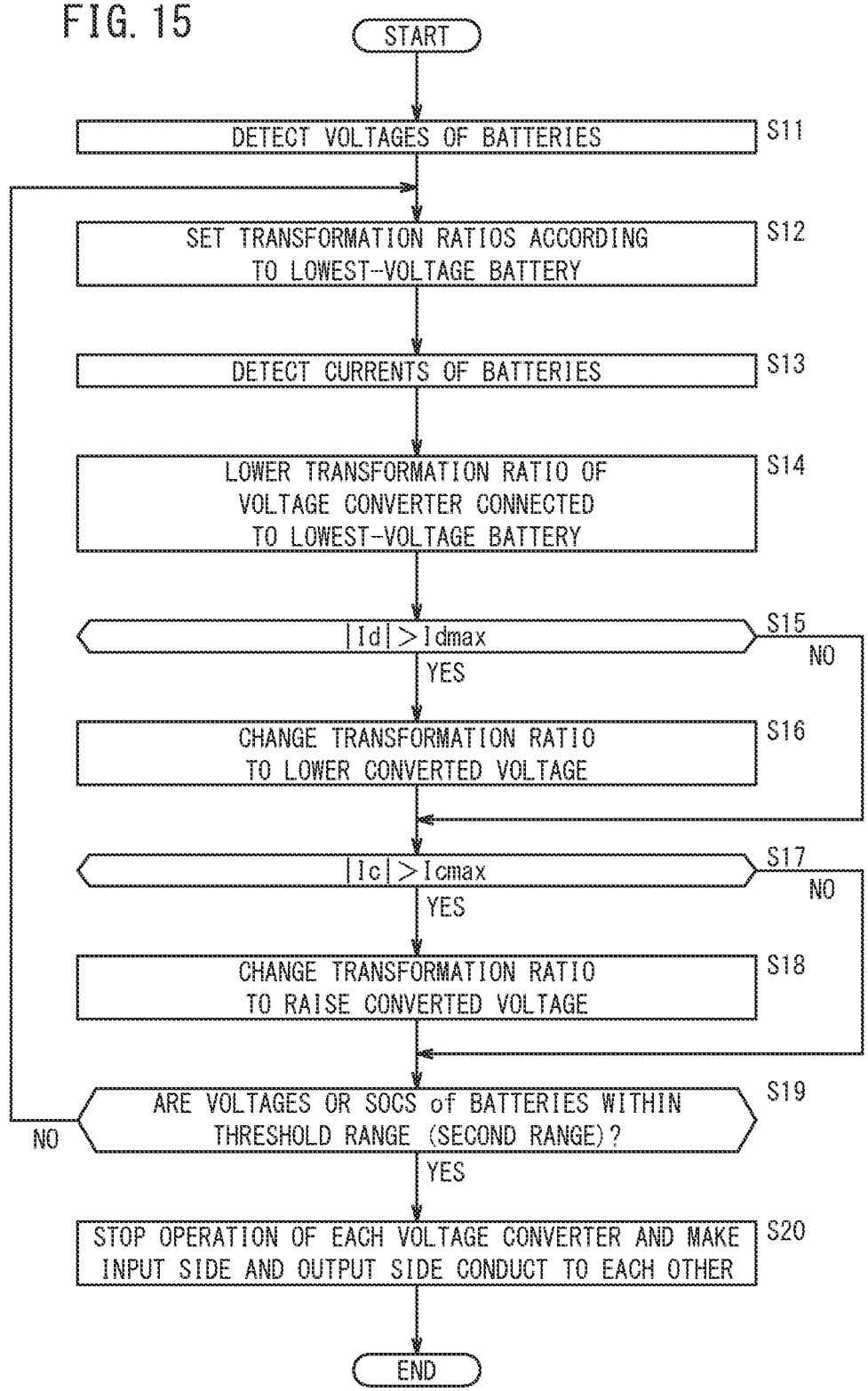

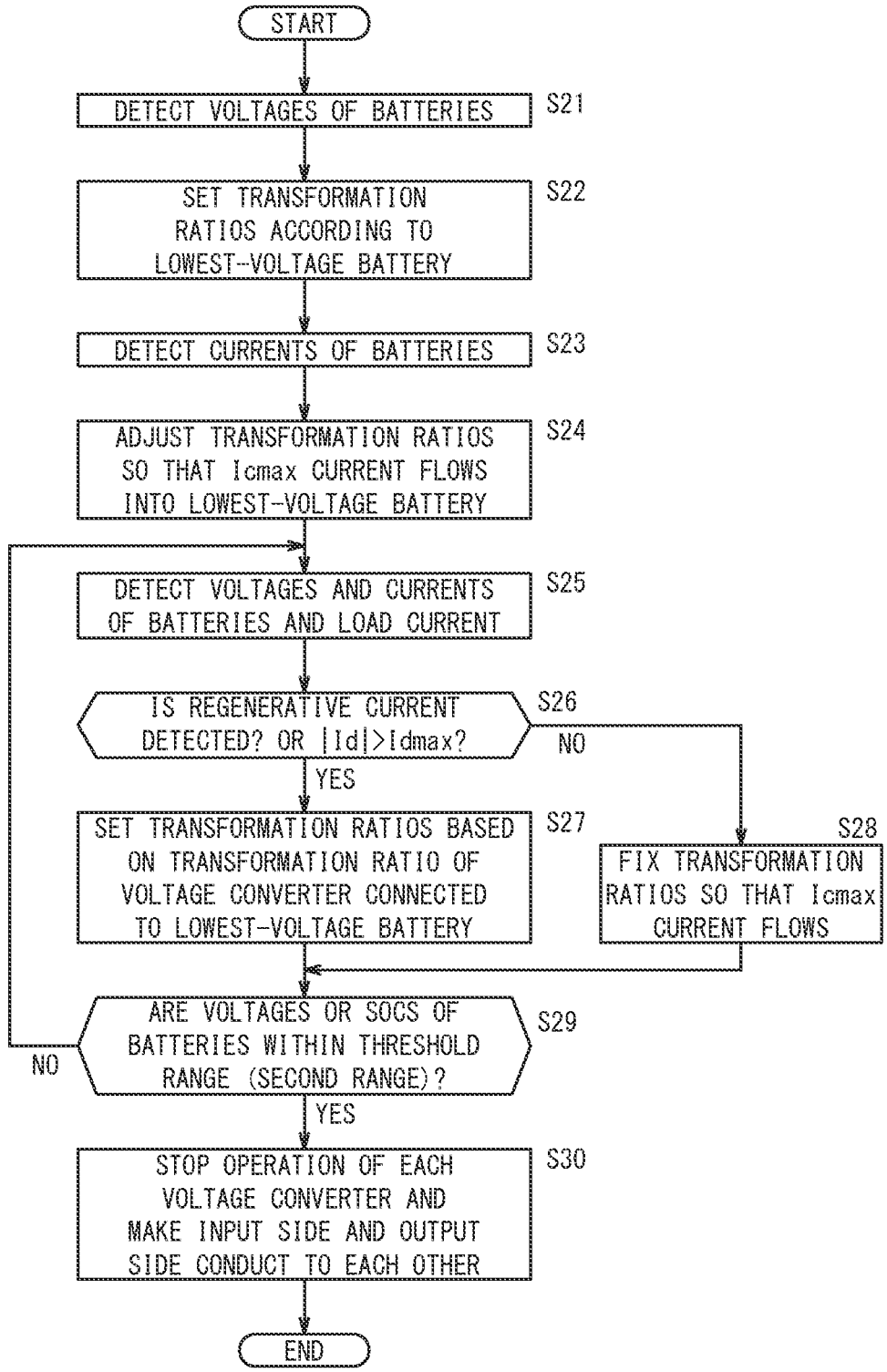

POWER SUPPLY SYSTEM

TECHNICAL FIELD

The present invention relates to a power supply system in which a plurality of rechargeable and dischargeable batteries are connected in parallel to each other respectively through voltage converters.

BACKGROUND ART

For example, Japanese Patent No. 6293010 discloses a power supply system in which a plurality of rechargeable and dischargeable batteries are connected in parallel to each other respectively through voltage converters.

SUMMARY OF INVENTION

By the way, when a plurality of batteries with different voltages or SOCs are connected in parallel to each other, the plurality of batteries are charged and discharged so as to make the voltages or SOCs equal among the batteries, where currents flow in proportion to the voltage differences among the batteries. In this case, if the plurality of batteries are wired simply, a small, negligible voltage difference will cause no problem even if the batteries are directly connected in parallel.

However, parallel connection of a plurality of batteries having large voltage differences causes large current to flow due to the voltage differences. Further, in such a condition, even when the plurality of batteries are connected in parallel respectively through voltage converters, a large current flows the moment a switching device of the voltage converter is turned on, and a high voltage generates due to the wiring inductance component the moment it is turned off. Such large current or high voltage may deteriorate the batteries.

The present invention has been made considering such a problem, and an object of the invention is to provide a power supply system capable of equalizing voltages or SOCs of a plurality of batteries connected in parallel to each other, while avoiding deterioration of the batteries.

An aspect of the present invention is directed to a power supply system including: a plurality of batteries that are rechargeable and dischargeable; a plurality of voltage converters each having a primary side connected to one of the plurality of batteries, the plurality of voltage converters having respective secondary sides connected in parallel to each other, each of the plurality of voltage converters being configured to convert a voltage of the battery connected to the primary side thereof at an arbitrary transformation ratio and to output the converted voltage to the secondary side; and a plurality of current measuring devices connected respectively to the primary sides of the plurality of voltage converters, and configured to measure currents flowing on the primary sides. In this case, for each of the plurality of voltage converters, the transformation ratio is set so that the current measured by the current measuring device connected to the primary side falls within a first range between a discharge current maximum value of the battery connected to the primary side and a charging current maximum value of the battery.

According to the invention, if the currents measured by the current measuring devices are within the first range between the discharge current maximum value and the charging current maximum value, current flows automatically (naturally) from a battery having a higher voltage or SOC to a battery having a lower voltage or SOC, and the batteries are thus charged and discharged. On the other hand, if the currents are out of the first range, the transformation ratios are adjusted so that the currents fall within the first range. As a result, it is possible to equalize the voltages or SOCs of the plurality of parallel-connected batteries, while avoiding deterioration of the plurality of batteries.

BRIEF DESCRIPTION OF DRAWINGS

FIG. 5 is a conceptual diagram illustrating charging and discharging of a plurality of batteries in an embodiment;

FIGS. 7A, 7B, and 7C are explanatory diagrams used to explain charging and discharging between two batteries;

FIGS. 8A, 8B, and 8C are explanatory diagrams used to explain charging and discharging between two batteries;

FIGS. 11A and 11B are explanatory diagrams used to explain charging and discharging between two batteries;

FIG. 13 is a timing chart illustrating charging and discharging between four batteries;

FIG. 14 is a flowchart illustrating operations of the power supply system of FIG. 1;

FIG. 15 is a flowchart according to a first modification; and

FIG. 16 is a flowchart according to a second modification.

DESCRIPTION OF EMBODIMENTS

The power supply system according to the present invention will be described in connection with preferred embodiments while referring to the accompanying drawings.

[1. Basic Configuration of Embodiment]

Figure 1:
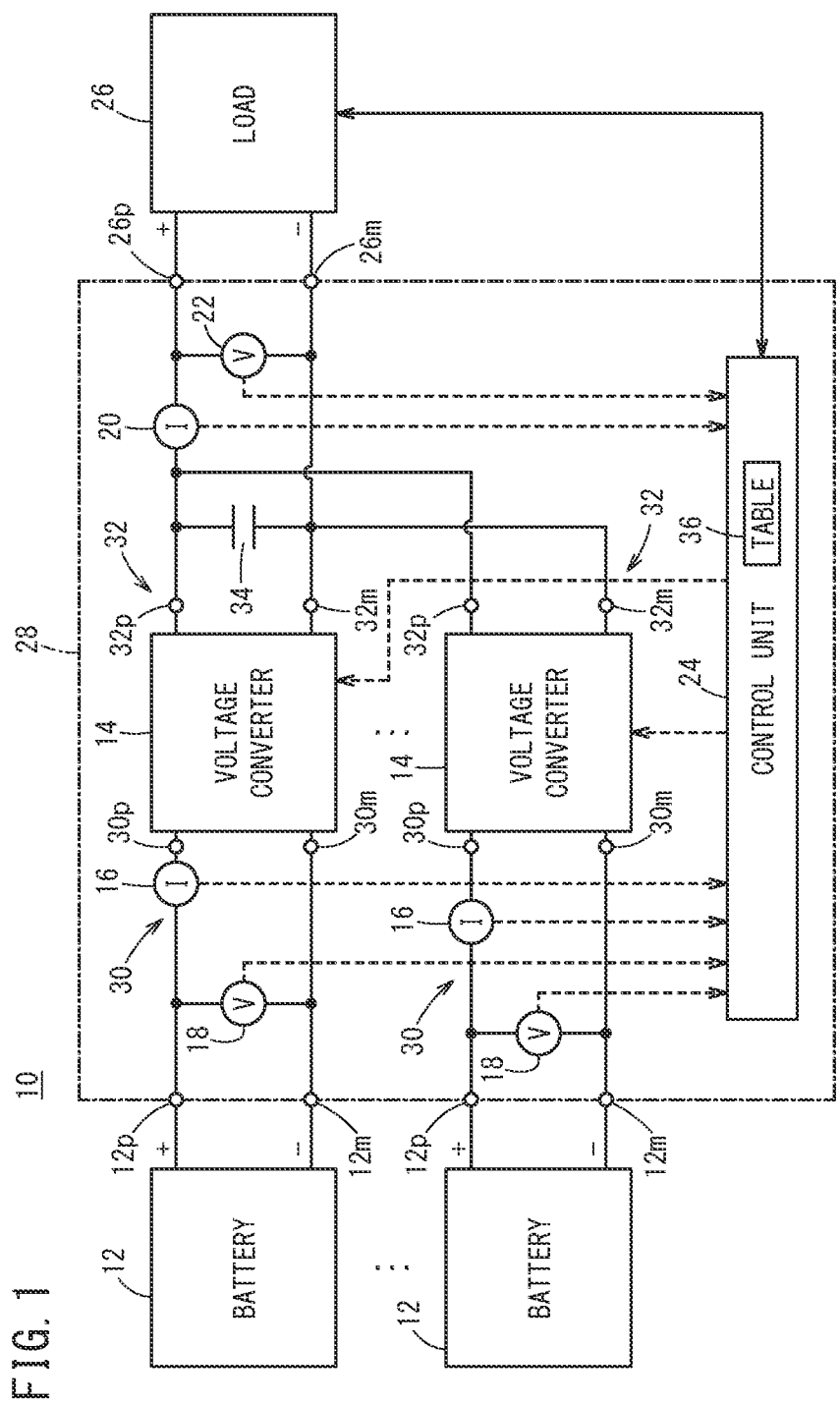
FIG. 1 is a configuration diagram of a power supply system according to an embodiment.

As shown in FIG. 1, a power supply system 10 of an embodiment includes a plurality of batteries 12, a plurality of voltage converters 14, a plurality of primary-side current measuring devices 16, a plurality of primary-side voltage measuring devices 18, a secondary-side current measuring device 20, a secondary-side voltage measuring device 22, and a control unit 24. The power supply system 10 is applied to power supply systems of electric vehicles, such as two-wheeled vehicles, four-wheeled vehicles, etc., for example. The plurality of voltage converters 14, the plurality of primary-side current measuring devices 16, the plurality of primary-side voltage measuring devices 18, the secondary-side current measuring device 20, the secondary-side voltage measuring device 22, the control unit 24, and so on, constitute a power supply unit 28 that equalizes voltages or SOCs of the plurality of batteries 12 as will be described hereinafter, while supplying electric power from the plurality of batteries 12 to a load 26, such as a drive motor of an electric vehicle, for example.

The plurality of batteries 12 are batteries that are attachable to and removable from the power supply unit 28 constituting the power supply system 10 and that are rechargeable and dischargeable. The plurality of voltage converters 14 are DC/DC converters each having a primary side 30 and a secondary side 32. Each voltage converter 14 converts the voltage (primary-side voltage) of the battery 12 connected to its primary side 30 at an arbitrary ratio of transformation (conversion), Tr (step-up ratio Tru or step-down ratio Trd), and outputs the converted voltage (secondary-side voltage) to the secondary side 32. In this embodiment, it is sufficient that at least one of the plurality of batteries 12 is attachable and removable to and from the power supply system 10.

The primary side 30 of each of the plurality of voltage converters 14 is connected to one of the plurality of batteries 12. That is, a positive terminal 12p of the battery 12 and a positive terminal 30p on the primary side 30 of the voltage converter 14 are connected to each other, and a negative terminal 12m of the battery 12 and a negative terminal 30m on the primary side 30 of the voltage converter 14 are connected to each other. Further, the secondary sides 32 of the plurality of voltage converters 14 are connected in parallel to each other and connected to the load 26 in parallel. In this case, positive terminals 32p on the secondary sides 32 of the plurality of voltage converters 14 are connected to a positive terminal 26p of the load 26, and the negative terminals 32m on the secondary sides 32 of the plurality of voltage converters 14 are connected to a negative terminal 26m of the load 26.

The plurality of primary-side voltage measuring devices 18 are voltage sensors each connected between the positive terminal 12p and negative terminal 12m of the battery 12, on the primary side 30 of the voltage converter 14. The plurality of primary-side current measuring devices 16 are current sensors each connected between the positive terminal 12p of the battery 12 and the positive terminal 30p of the voltage converter 14, on the primary side 30 of the voltage converter 14.

The secondary-side voltage measuring device 22 is a voltage sensor connected between the positive terminal 26p and the negative terminal 26m of the load 26, on the secondary sides 32 of the plurality of voltage converters 14. The secondary-side current measuring device 20 is a current sensor connected between the positive terminal 32p of each of the plurality of voltage converters 14 and the positive terminal 26p of the load 26, on the secondary sides 32 of the plurality of voltage converters 14. Further, on the secondary side 32 of each of the plurality of voltage converters 14, a capacitor 34 is connected between the positive terminal 32p and the negative terminal 32m.

The control unit 24 is a computer that contains a table 36 described later, which executes a program stored in a memory (not shown) to control voltage conversion operations etc. between the primary sides 30 and the secondary sides 32 that are performed by the plurality of voltage converters 14, based on requirements (load requirements) from the load 26.

[2. Basic Operations of Embodiment]

In the power supply system 10 configured as described above, when the plurality of removable batteries 12 are connected to the power supply unit 28 and the load 26 is connected to the power supply unit 28, then each of the plurality of primary-side voltage measuring devices 18 measures the voltage (primary-side voltage) of the battery 12 connected thereto, and sends the measurements to the control unit 24 in succession. Also, each of the plurality of primary-side current measuring devices 16 measures the current flowing on the primary side 30 (primary-side current) and sends the measurements to the control unit 24 in succession. Each primary-side current measuring device 16 measures the current flowing from the battery 12 to the voltage converter 14 (discharge current Id) while the battery 12 is discharging, and measures the current flowing from the voltage converter 14 into the battery 12 (charging current Ic) while the battery 12 is being charged.

The secondary-side voltage measuring device 22 measures the voltage on the secondary sides 32 (a load voltage as secondary-side voltage) and sends the measurements to the control unit 24 in succession. Further, the secondary-side current measuring device 20 measures the current flowing on the secondary sides 32 (a load current IL as secondary-side current) and sends the measurements to the control unit 24 in succession. The secondary-side current measuring device 20 measures the load current IL flowing from the plurality of voltage converters 14 to the load 26 (powering current) in powering operation, and measures the load current IL flowing from the load 26 to the plurality of voltage converters 14 (regenerative current) in regenerative operation.

On the basis of the received measurements of the voltages and currents and the requirement (load requirement) from the load 26, the control unit 24 determines command values of the transformation ratios (conversion ratios) Tr for the individual voltage converters 14, and sends the set command values to the plurality of voltage converters 14, respectively. Each of the plurality of voltage converters 14 adjusts the transformation ratio Tr based on the command value received, and converts the voltage of the battery 12 connected thereto using the adjusted transformation ratio Tr and outputs the converted voltage to the secondary side 32. In FIG. 1, the secondary sides 32 of the plurality of voltage converters 14 are connected in parallel to each other. Accordingly, the control unit 24 sends command values to the voltage converters 14 so that the voltages on the secondary sides 32 of the plurality of voltage converters 14 become equal.

In this way, during powering operation, a load current IL (powering current) that corresponds to the sum total of the currents flowing from the plurality of batteries 12 flows to the load 26 from the plurality of batteries 12 through the plurality of voltage converters 14, so as to drive the load 26 such as a drive motor, for example. On the other hand, during regenerative operation, a load current IL (regenerative current) flows from the load 26 to the plurality of batteries 12 through the plurality of voltage converters 14, so as to charge the batteries 12.

[3. Modification of Configuration of FIG. 1]

Figure 2:
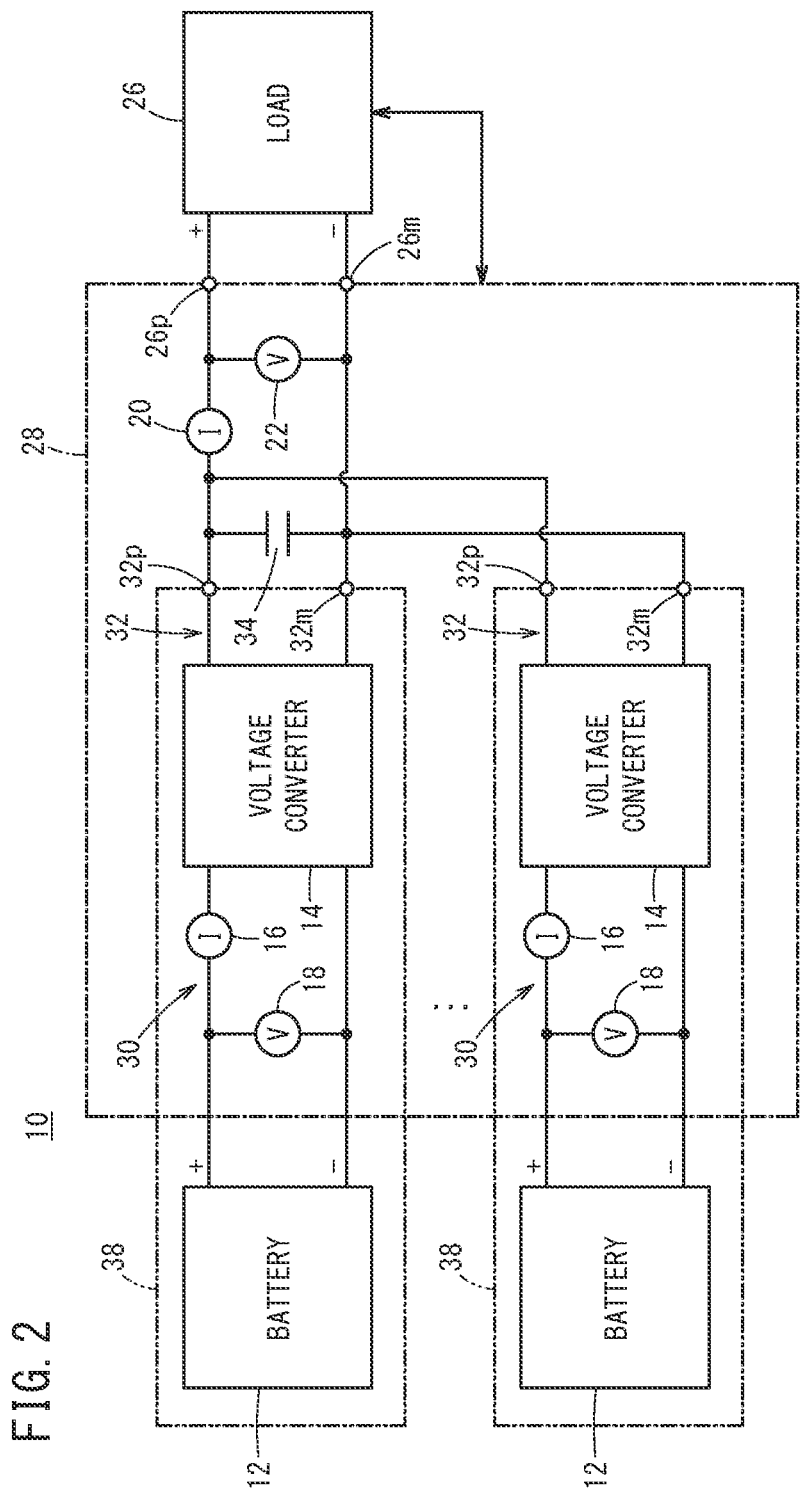
FIG. 2 is a configuration diagram of a modification of the power supply system of FIG. 1.

FIG. 2 shows a modification of the power supply system 10 of FIG. 1. The modification of FIG. 2 differs from the configuration of FIG. 1 in that one battery 12, one voltage converter 14 connected to this battery 12, and a primary-side current measuring device 16 and primary-side voltage measuring device 18 connected to the primary side 30 of this voltage converter 14, constitute one battery unit 38, and a plurality of battery units 38 can be attached to and removed from the power supply system 10. In this embodiment, it is sufficient that at least one of the plurality of battery units 38 is attachable and removable to and from the power supply system 10.

In this case, for example, the voltage converter 14 of each battery unit 38 of FIG. 2 is provided with the functions of the control unit 24 of FIG. 1. Further, when the plurality of battery units 38 are attached to the power supply system 10, each battery unit 38 can send and receive the measurements of the primary-side voltage measuring devices 18 and primary-side current measuring devices 16 to and from each other through a CAN (Controller Area Network). Thus, the voltage converter 14 of each battery unit 38 can set the transformation ratio Tr of the voltage converter 14 itself, based on a load requirement from the load 26, the measurements of the primary-side voltage measuring device 18 and primary-side current measuring device 16 of its own battery unit 38, the measurements of the primary-side voltage measuring devices 18 and primary-side current measuring devices 16 received from other battery units 38, and the measurements of the secondary-side voltage measuring device 22 and secondary-side current measuring device 20.

[4. Specific Examples of Voltage Converters 14]

Figure 3A:
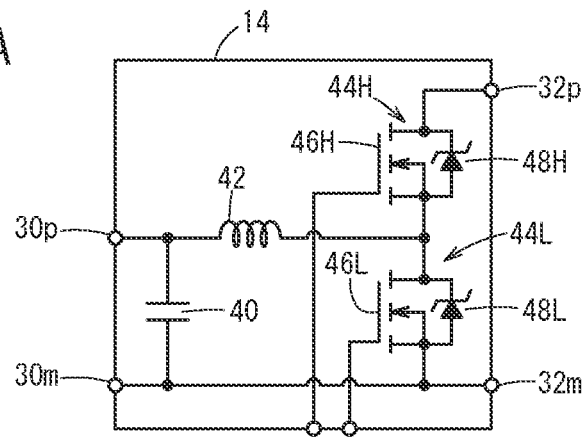
FIG. 3A is a circuit diagram of a step-up voltage converter.
Figure 3B:
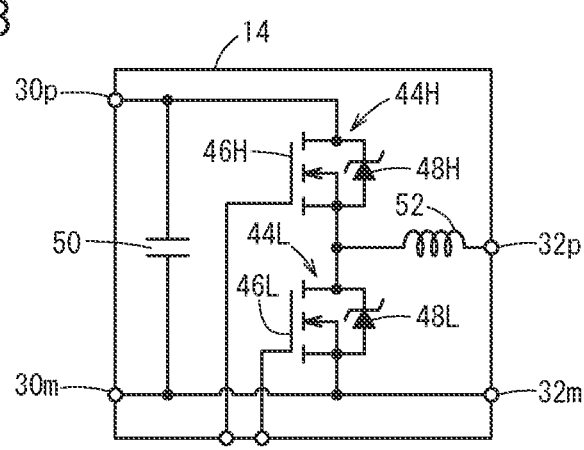
FIG. 3B is a circuit diagram of a step-down voltage converter.
Figure 3C:
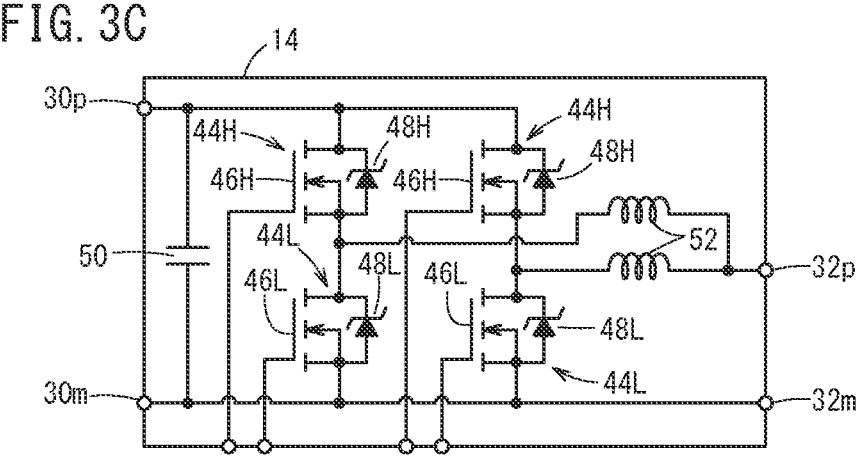
FIG. 3C is a circuit diagram of an interleaved step-down or step-up voltage converter.

FIGS. 3A to 3C are circuit diagrams showing specific examples of the voltage converters 14 of FIGS. 1 and 2. The voltage converters 14 are DC/DC converters of step-up type (see FIG. 3A), step-down type (see FIG. 3B), or interleaved step-down, or step-up/step-down type (see FIG. 3C). The configurations and operations of such DC/DC converters are well known and therefore the connections between the constituent components in the circuit diagrams of FIGS. 3A to 3C will be briefly described below.

In the voltage converter 14 of FIG. 3A, a capacitor 40 is connected between the positive terminal 30$p$ and the negative terminal 30$m$ on the primary side 30. A coil 42 has its one end connected to the positive terminal 30$p$ side of the capacitor 40. The other end of the coil 42 is connected to a middle point between two switching devices 44H, 44L connected in series. The two switching devices 44H, 44L are each composed of a parallel connection of a MOSFET (Metal Oxide Semiconductor Field Effect Transistor) 46H, 46L and a Zener diode 48H, 48L being a parasitic diode. One switching device 44H is a high-side switching device connected to the positive terminal 32$p$ of the secondary side 32. The other switching device 44L is a low-side switching device connected to the negative terminal 32$m$ of the secondary side 32.

In the voltage converter 14 of FIG. 3B, a capacitor 50 is connected between the positive terminal 30$p$ and the negative terminal 30$m$ of the primary side 30. Series connected two switching devices 44H, 44L are connected in parallel to the capacitor 50. One switching device 44H is a high-side switching device connected to the positive terminal 30$p$ side of the capacitor 50. The other switching device 44L is a low-side switching device connected to the negative terminal 30$m$ side of the capacitor 50 and the negative terminal 32$m$ of the secondary side 32. A coil 52 has its one end connected to a middle point between the two switching devices 44H, 44L. The other end of the coil 52 is connected to the positive terminal 32$p$ of the secondary side 32.

The voltage converter 14 of FIG. 3C differs from the voltage converter 14 of FIG. 3B in that two sets of circuits each including the two switching devices 44H, 44L and one coil 52 of FIG. 3B are connected in parallel between the capacitor 50 connected to the positive terminal 30$p$ and the negative terminal 30$m$ of the primary side 30 and the positive terminal 32$p$ and the negative terminal 32$m$ of the secondary side 32.

In any of the voltage converters 14, the transformation ratio Tr (step-up ratio Tru in FIG. 3A, step-down ratio Trd in FIG. 3B, and step-up ratio Tru or step-down ratio Trd in FIG. 3C) of the voltage converter 14 can be changed by changing the duty of the gate signal supplied to the gate terminal of each switching device 44H, 44L (MOSFETs 46H, 46L).

[5. Characteristic Function of Embodiment]

Next, a characteristic function of the power supply system 10 of the embodiment (hereinafter referred to also as a characteristic function of the embodiment) will be described referring to FIGS. 4A to 16. The characteristic function of the embodiment is that, in operation in which a plurality of batteries 12 having different voltages or SOCs are connected in parallel and charged and discharged by currents flowing between the plurality of batteries 12 in such a manner as to equalize the voltages or SOCs, the transformation ratio Tr of each of the plurality of voltage converters 14 is set so that the current falls within a given allowable range (first range) between the discharge current maximum value Idmax (the upper limit value of the absolute value of the discharge current Id) of the battery 12 and the charging current maximum value Icmax (the upper limit value of the absolute value of the charging current Ic) thereof.

The discharge current maximum value Idmax is the upper limit value (threshold) of the discharge current Id flowing to such a degree as not to deteriorate the battery 12, and is a value guaranteed by the manufacturer of the battery 12 or a guaranteed value of the product. The charging current maximum value Icmax is the upper limit (threshold) of the charging current Ic flowing to such a degree as not to deteriorate the battery 12, and is a value guaranteed by the manufacturer of the battery 12 or a guaranteed value of the product.

<5.1 Problem (Comparative Example)>

Figure 4A:
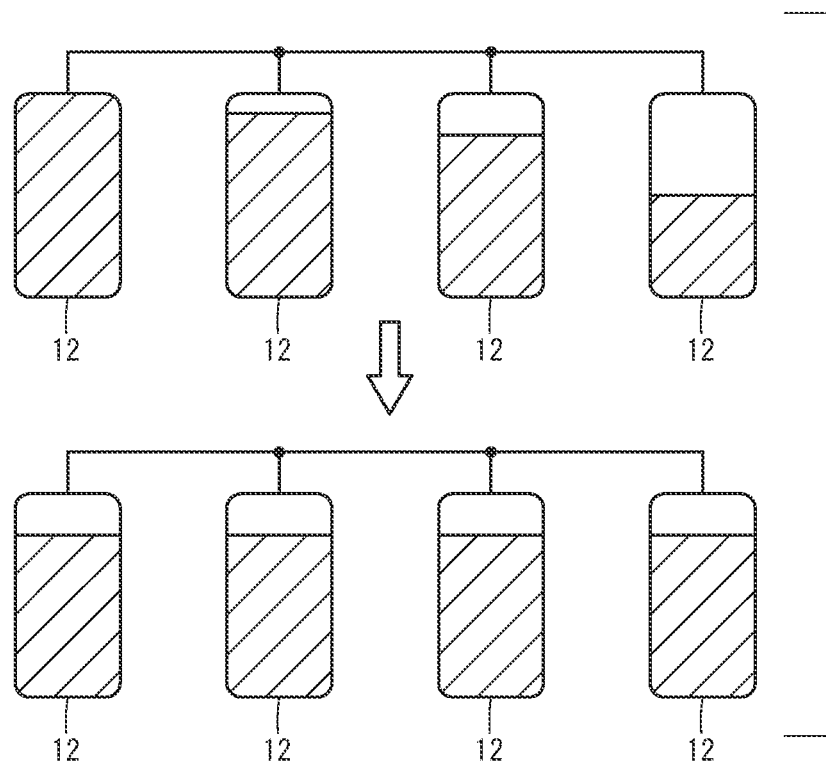
FIG. 4A is a conceptual diagram illustrating a parallel connection of a plurality of batteries according to a comparative example.

FIG. 4A is a conceptual diagram illustrating a problem (comparative example) that arises in operation to equalize voltages or SOCs of the plurality of parallel-connected batteries 12 having different voltages or SOCs. In the comparative example, the same constituent components as those in FIGS. 1 to 3C are labeled using the same reference numerals.

FIG. 4A shows an example in which four batteries 12 with different SOCs are connected in parallel. In FIG. 4A, the SOCs become smaller in order from the left-hand battery 12 to the right-hand battery 12. FIG. 4A schematically shows the magnitudes of the voltages or SOCs of the plurality of batteries 12 by means of the sizes of the hatched areas of the blocks of the batteries 12.

In the comparative example, with the four batteries 12 connected in parallel, currents flow between the four batteries 12 in such a manner as to equalize the SOCs. Specifically, discharge currents Id flow from the batteries 12 with relatively high SOCs (the two batteries 12 on the left-hand side in FIG. 4A) into the batteries 12 with relatively low SOCs (the two batteries 12 on the right-hand side in FIG. 4A) as charging currents Ic.

Then, when four batteries 12 are simply wired to connect them in parallel as in the comparative example, a small, negligible voltage difference causes no problem even if the batteries 12 are directly connected in parallel. However, connecting a plurality of batteries 12 having large voltage differences will cause large current to flow the moment they are wired, due to the voltage differences. In such a condition, even when the plurality of batteries 12 are connected in parallel through voltage converters 14, simply turning on the switching devices 44H, 44L of the voltage converters 14 will cause large current to flow at the instant of turning on. Further, simply turning off the switching devices 44H, 44L causes high voltage to generate due to the inductance component of the wiring, at the instant of turning off. Such large current or high voltage may deteriorate the batteries 12.

<5.2 Outlines of Characteristic Function of Embodiment>

Figure 4B:
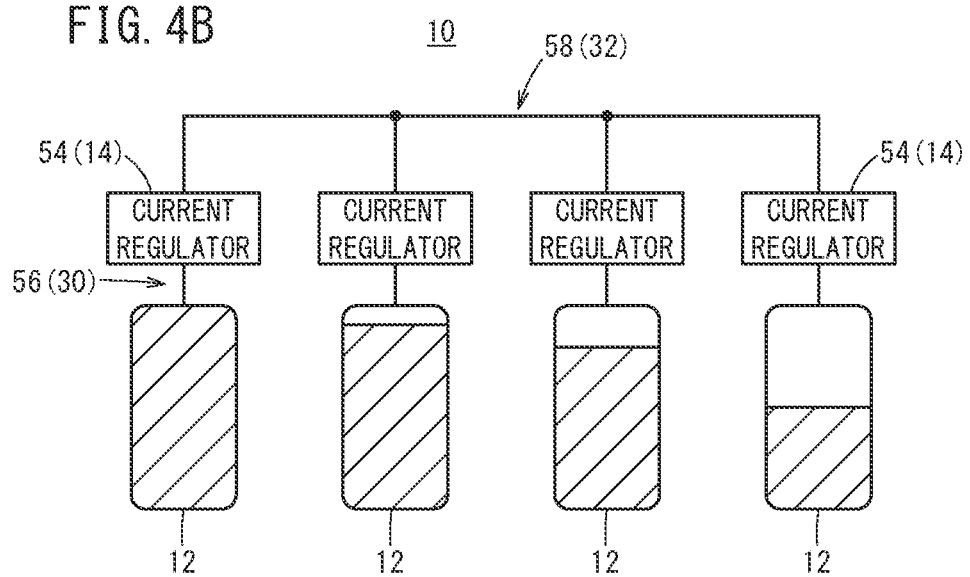
FIG. 4B is a conceptual diagram illustrating a parallel connection of a plurality of batteries according to an embodiment.

FIG. 4B is a conceptual diagram illustrating the characteristic function of the embodiment for solving the problem of FIG. 4A.

In the characteristic function of the embodiment, a plurality of batteries 12 are connected in parallel respectively through a plurality of current regulators 54. In this case, each of the plurality of current regulators 54 performs current regulation so that the current flowing to and from the battery 12 connected to its primary side 56 falls within a given allowable range (first range). The first range is an allowable range of the discharge current Id or charging current Ic between the discharge current maximum value Idmax and the charging current maximum value Icmax of the battery 12.

Now, a battery 12 having a relatively high voltage or SOC functions as a discharging battery 12 and causes a discharge current Id to flow. On the other hand, a battery 12 having a relatively low voltage or SOC is a battery 12 to be charged and a charging current Ic flows into it. Accordingly, the current regulators 54 perform current regulation so that the discharge current Id and charging current Ic both fall within the first range.

If each current regulator 54 includes the switching devices 44H, 44L, the peak current generating at turning on or off of the switching devices 44H, 44L may cause the discharge current Id or charging current Ic to deviate from the first range. In such a case, the discharge current Id or charging current Ic can be made to fall within the first range by making smaller the voltage difference between the secondary side 58 of the current regulator 54 of the discharging battery 12 and the secondary side 58 of the current regulator 54 of the charged battery 12. It is thus possible to promptly equalize the voltages or SOCs of the batteries 12, while keeping the discharge current Id or charging current Ic within the first range.

In the power supply system 10 of the embodiment, the plurality of batteries 12 are connected in parallel respectively through the plurality of voltage converters 14 (see FIGS. 1 and 2). Each of the plurality of voltage converters 14 converts the voltage on the primary side 30 at a transformation ratio Tr to output the converted voltage to the secondary side 32. In this case, the voltage on the secondary side 32 can be adjusted by varying the transformation ratio Tr so as to make smaller the voltage difference on the secondary sides 32 of the plurality of voltage converters 14 so that the discharge current Id and charging current Ic fall within the first range. Accordingly, the voltage converters 14 of FIGS. 1 to 3C correspond to the current regulators 54 of FIG. 4B. The primary side 30 of the voltage converter 14 corresponds to the primary side 56 of the current regulator 54. The secondary side 32 of the voltage converter 14 corresponds to the secondary side 58 of the current regulator 54.

<5.3 Outlines of Charging and Discharging by Characteristic Function of Embodiment>

Next, a method for charging and discharging the plurality of batteries 12 by means of the characteristic function of the embodiment will be described referring to FIGS. 5 to 6B.

FIG. 5 is a conceptual diagram illustrating charging and discharging operation between a plurality of batteries 12 that are connected in parallel to the load 26 respectively through the current regulators 54 (voltage converters 14) in the absence of a load requirement (when it is not necessary to send a load current IL).

In FIG. 5, the left-hand battery 12 has the largest voltage or SOC and functions as a discharging battery 12. On the other hand, the right-hand, three batteries 12 have relatively low voltages or SOCs and are batteries 12 to be charged. That is, in FIG. 5, a discharge current Id flows from the left-hand battery 12, and the discharge current Id is distributed and flows into the right-hand, three batteries 12 as charging currents Ic1 to Ic3 ($|Id|=|Ic1|+|Ic2|+|Ic3|$). No load current IL therefore flows (IL=0).

Further, in FIG. 5, the current regulators 54 perform current regulation so that the discharge current Id and the charging currents Ic1 to Ic3 fall within the first range, that is, so that the absolute value of the discharge current Id is not greater than the discharge current maximum value Idmax ($|Id| \leq Idmax$) and the absolute values of the charging currents Ic1 to Ic3 are not greater than the charging current maximum value Icmax ($|Ic1| \leq Icmax$, $|Ic2| \leq Icmax$, $|Ic3| \leq Icmax$). It is thus possible to equalize the voltages or SOCs of the plurality of batteries 12 while keeping the discharge current Id and the charging currents Ic1 to Ic3 within the first range.

Figure 6A:
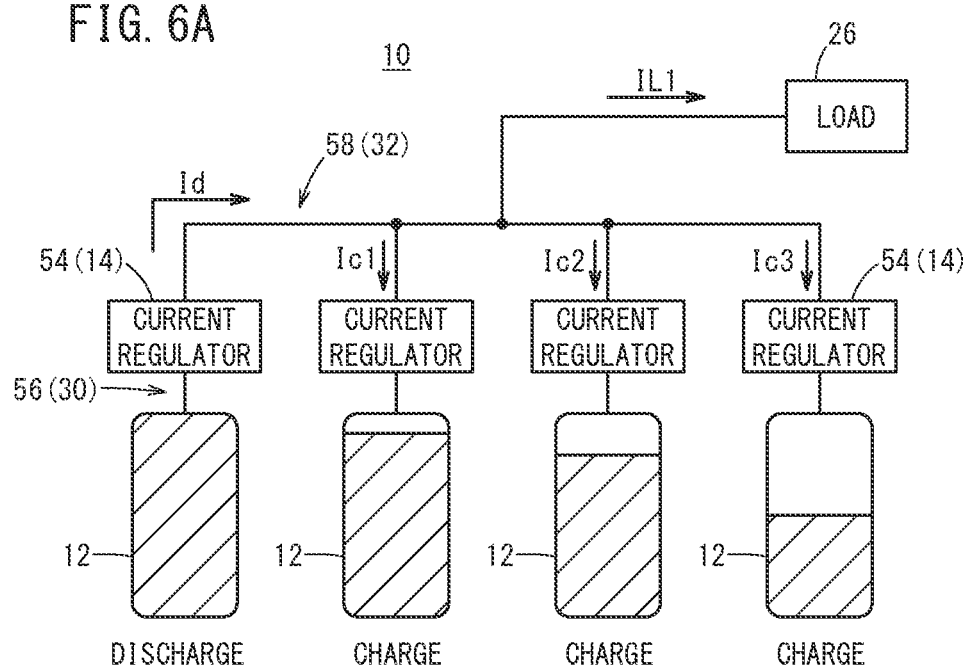
FIGS. 6A and 6B are conceptual diagrams illustrating charging and discharging of a plurality of batteries where a current is passed to a load.

FIG. 6A is a conceptual diagram illustrating charging and discharging operation between the plurality of batteries 12 in the presence of a load requirement, i.e., in a case where a load current IL1 has to be sent to the load 26. In this case, in order to send part of the discharge current Id as the load current IL1, the charging currents Ic1 to Ic3 flowing to the right-hand, three batteries 12 are made smaller. That is, the absolute values of the charging currents Ic1 to Ic3 are made smaller than those of FIG. 5. It is then possible to equalize the voltages or SOCs among the plurality of batteries 12, while sending the load current IL1 to the load 26 in response to the load requirement and supplying the charging currents Ic1 to Ic3 to the three batteries 12.

Figure 6B:
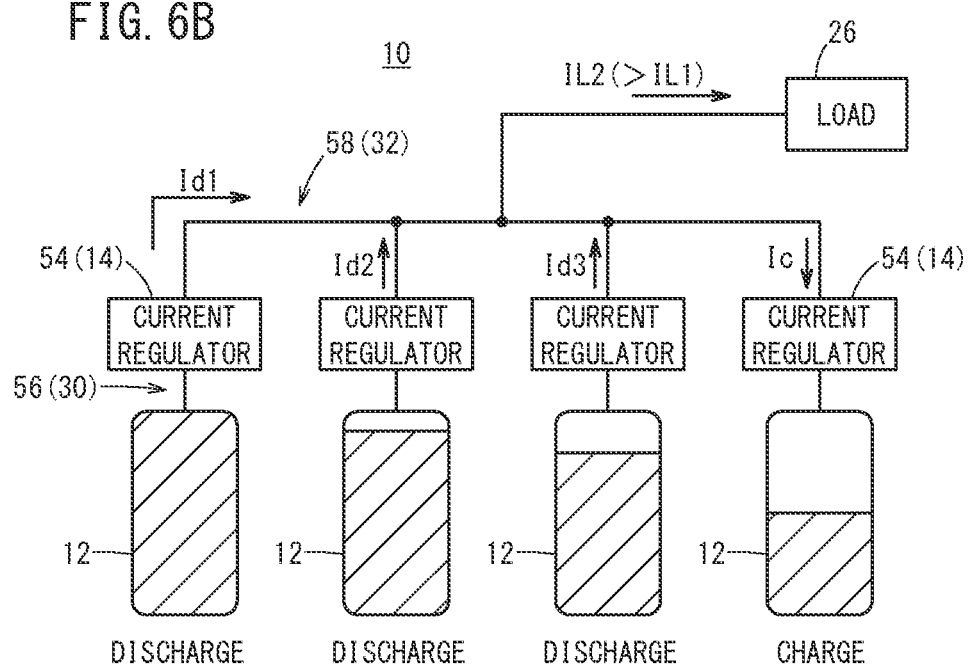

FIG. 6B is a conceptual diagram illustrating charging and discharging operation between the plurality of batteries 12 in the presence of a load requirement that is larger than that in FIG. 6A, e.g., in a case where the load requirement demands a discharge current Id that will exceed the discharge current maximum value Idmax if one battery 12 functions as a discharging battery 12. In this case, since the load current IL2 is large (IL2>IL1), if only a single battery 12 functions as a discharging battery, the absolute value of the discharge current Id flowing from this single battery 12 will exceed the discharge current maximum value Idmax ($|Id|>Idmax$).

Accordingly, in the case of FIG. 6B, the three batteries 12 on the left-hand side are made to function as discharging batteries and the remaining, one battery 12 on the right-hand side is charged, for example. Thus, discharge currents Id1 to Id3 flow from the three batteries 12, and the current corresponding to the sum total of the discharge currents Id1 to Id3 is divided into the load current IL2 and charging current Ic ($|Id1|+|Id2|+|Id3|=|IL2|+|Ic|$). As a result, it is possible to send the load current IL2 corresponding to the load requirement to the load 26 and supply the charging current Ic to the single battery 12, while keeping the absolute values of the discharge currents Id1 to Id3, flowing from the three batteries 12, at or below the discharge current maximum value Idmax (|Id1|≤Idmax, |Id2|≤Idmax, |Id3|≤Idmax). In this case, too, the voltages or SOCs of the plurality of batteries 12 can be equalized.

<5.4 Adjustment of Discharge Current Id or Charging Current Ic by Varying Transformation Ratio Tr>

Next, regarding the characteristic function of the embodiment, referring to the explanatory diagrams of FIG. 7A to 9, operations will be described in which a discharge current Id or charging current Ic is adjusted by adjusting the voltage difference between the secondary sides 32 of the plurality of voltage converters 14 by varying the transformation ratios Tr. Here, an example will be described where the plurality of voltage converters 14 are step-up DC/DC converters (see FIG. 3A).

As shown in FIG. 7A, two batteries 12 are connected in parallel on the secondary side 32 through voltage converters 14, with the left-hand battery 12 having a relatively large SOC and the right-hand battery 12 having a relatively small SOC. Now, if the transformation ratios Tr (step-up ratios Tru) of the two voltage converters 14 are equal, the large difference in SOC between the two batteries 12 produces a large difference in voltage between the secondary sides 32 of the two voltage converters 14, causing a large current to flow from the discharging battery 12 on the left-hand side to the charged battery 12 on the right-hand side.

On the other hand, as shown in FIG. 7B, when the transformation ratios Tru of the two voltage converters 14 are varied so that the voltages on the secondary sides 32 of the two voltage converters 14 become equal, then there is no voltage difference on the secondary sides 32 and no current flows from the left-hand, discharging battery 12 to the right-hand, charged battery 12 (|Id|=|Ic|=0).

Hence, according to the characteristic function of the embodiment, as shown in FIG. 7C, the step-up ratios Tru are adjusted in such a manner that the absolute value of the discharge current Id does not exceed the discharge current maximum value Idmax and the absolute value of the charging current Ic does not exceed the charging current maximum value Icmax. It is then possible to cause a current with a desired current value I (|Id|=|Ic|=I) to flow from the left-hand battery 12 to the right-hand battery 12 so as to equalize the voltages or SOCs of the two batteries 12.

Further, as shown in FIG. 8A, in the operation in which the voltages or SOCs are equalized between the two batteries 12 by causing a current to flow from the left-hand battery 12 to the right-hand battery 12 (|Id|=|Ic|=I1), the voltage or SOC of the left-hand battery 12 lowers as time passes, while the voltage or SOC of the right-hand battery 12 increases. Then, if the step-up ratios Tru of the two voltage converters 14 are left unchanged, then, as shown in FIG. 8B, the voltage difference between the secondary sides 32 of the two voltage converters 14 becomes smaller and hence the current flowing from the left-hand battery 12 to the right-hand battery 12 becomes smaller (|Id|=|Ic|=I2<I1). As a result, the equalization of the voltages or SOCs between the two batteries 12 may be delayed.

Accordingly, for the two voltage converters 14, as shown in FIG. 8C, the step-up ratio Tru on the charged-side (right-hand side) voltage converter 14 is lowered to lower the voltage on the secondary side 32 of the right-hand voltage converter 14, while monitoring the discharge current Id and the charging current Ic using the primary-side current measuring devices 16 (see FIGS. 1 and 2). This increases the voltage difference between the secondary sides 32 of the two voltage converters 14, preventing the absolute values of the discharge current Id and charging current Ic from lowering. It should be noted that keeping lowering the step-up ratio Tru may reverse the relation between the magnitudes of the voltages or SOCs of the two batteries 12, and therefore the step-up ratio Tru should not be lowered below the step-up ratio Tru at the beginning of the equalizing operation.

Figure 9:
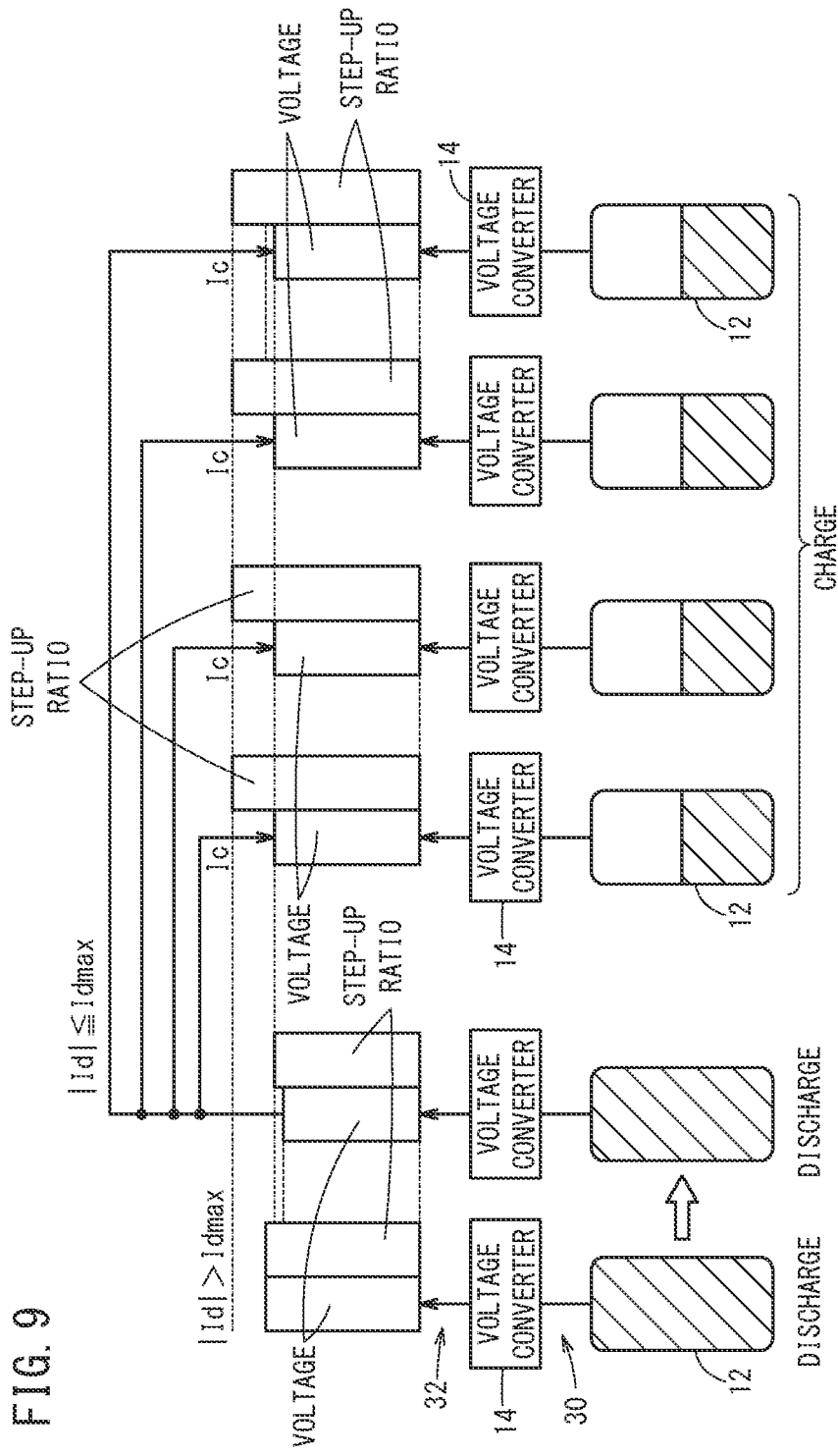
FIG. 9 is an explanatory diagram used to explain charging and discharging between five batteries.

FIG. 9 illustrates an operation to equalize voltages or SOCs between five batteries 12 in an example in which the five batteries 12 are connected in parallel through voltage converters 14 and the left-hand battery 12 functions as a discharging battery to charge the right-hand, four batteries 12.

Here, if there is a possibility that the absolute value of the discharge current Id may exceed the discharge current maximum value Idmax (|Id|>Idmax), the step-up ratio Tru of the left-hand voltage converter 14 is lowered to lower the voltage on the secondary side 32 of this voltage converter 14. This makes smaller the voltage difference between the secondary sides 32 of the left-hand voltage converter 14 and the right-hand, four voltage converters 14. As a result, it is possible to equalize the voltages or SOCs of the five batteries 12 by charging the right-hand, four batteries 12, while performing current regulation so that the absolute value of the discharge current Id stays equal to or under the discharge current maximum value Idmax (|Id|≤Idmax).

<5.5 Adjustment of Discharge Current Id or Charging Current Ic in Actual Circuits>

Examples will be described referring to FIGS. 10A to 13 in which the conceptual contents described using FIGS. 4A to 9 are implemented in the actual circuit configurations shown in FIGS. 1 to 3C. For the sake of simplicity of description, FIGS. 10A to 11B illustrate examples where, in the configurations shown in FIGS. 1 and 2, two batteries 12 are connected in parallel through voltage converters 14 on the secondary sides 32.

Figure 10A:
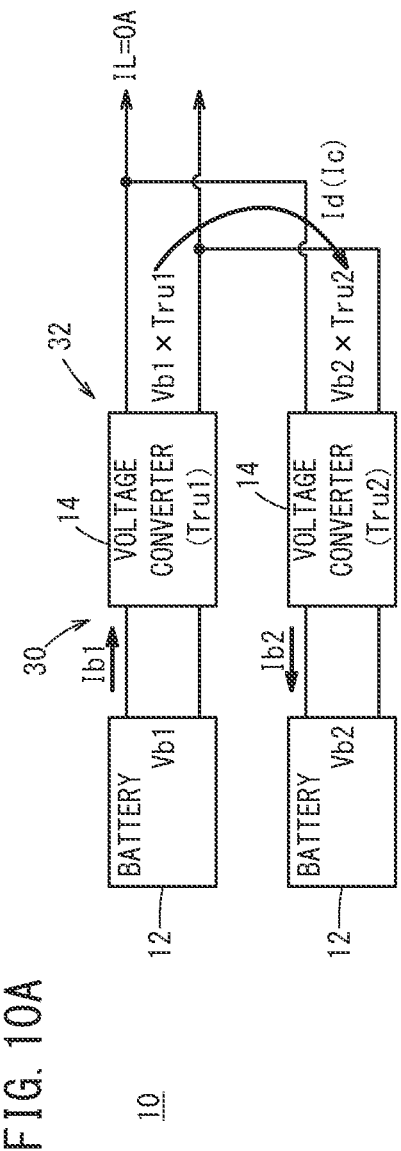
FIGS. 10A and 10B are explanatory diagrams used to explain charging and discharging between two batteries.

FIG. 10A corresponds to the conceptual diagram of FIG. 7A. In FIG. 10A, the voltage and current of one battery 12 are denoted by Vb1 and Ib1, respectively. The voltage and current of the other battery 12 are denoted by Vb2 and Ib2, respectively. Further, the transformation ratios Tru of the two voltage converters 14 are denoted by Tru1 and Tru2, respectively.

In this case, if Tru1=Tru2, the voltage difference between the secondary sides 32 of the two voltage converters 14 causes a flow of a large discharge current Id and charging current Ic. Here, if the load current IL is zero (IL=0), the discharge current Id and charging current Ic are represented by equation (1) below, where r denotes the internal resistance of each battery 12.

$$|Id|=|Ic|=|Vb1 \times Tru1 - Vb2 \times Tru2|/r \qquad (1)$$

In this case, if the absolute value of the discharge current Id exceeds the discharge current maximum value Idmax or if the absolute value of the charging current Ic exceeds the charging current maximum value Icmax, then the batteries 12 may deteriorate.

Figure 10B:
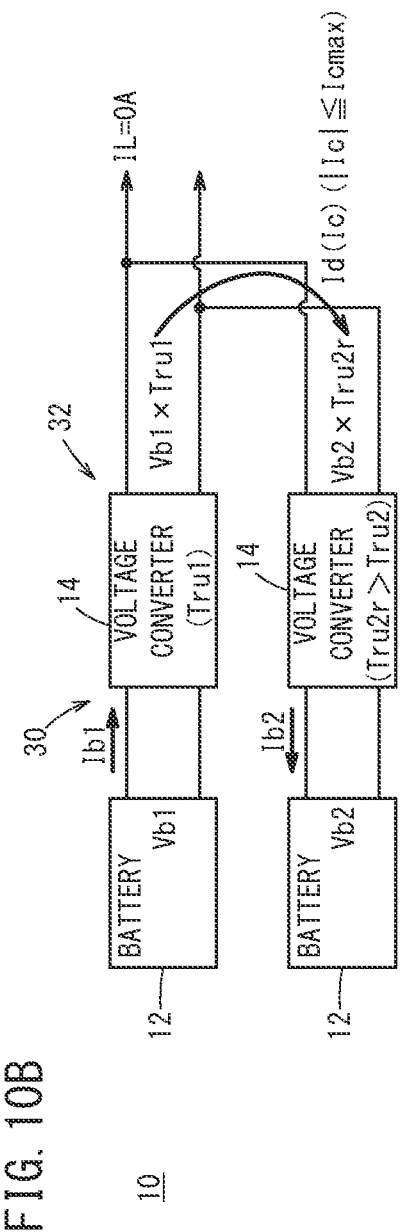
Figure 12A:
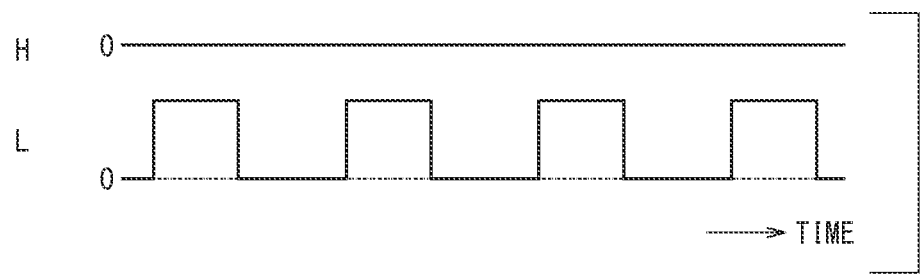
FIGS. 12A, 12B, and 12C are timing charts illustrating step-up operation, step-down operation, and step-up/step-down operation, respectively.

So, according to the characteristic function of the embodiment, as shown in FIG. 10B corresponding to the conceptual diagram of FIG. 7C, the duties of the gate signals supplied to the gate terminals of the switching devices 44H, 44L (see FIGS. 3A to 3C) forming the charged-side voltage converter 14 are varied to vary the transformation ratio Tr, for example. Specifically, in the case of a step-up voltage converter 14, as shown in FIGS. 3A and 12A, the duty of the gate signal supplied to the low-side switching device 44L ("L" in FIG. 12A) is changed to increase the step-up ratio from Tru2 to Tru2*r* (>Tru2), while keeping the gate signal supplied to the high-side switching device 44H ("H" in FIG. 12A) at the low level.

Thus, the voltage difference between the secondary sides 32 of the two voltage converters 14 becomes smaller and the discharge current Id and charging current Ic can fall within the first range. As a result, it is possible to equalize the voltages or SOCs of the batteries 12 while reducing deterioration of the batteries 12. Furthermore, performing the switching operations using MOSFETs 46H, 46L offers lower on-resistance values and hence reduced power loss.

Figure 12B:
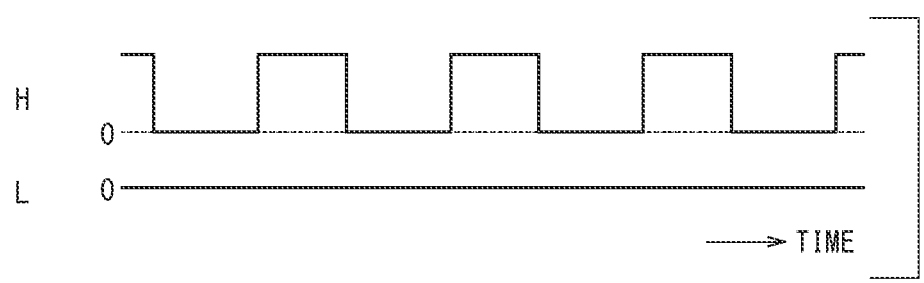
Figure 12C:
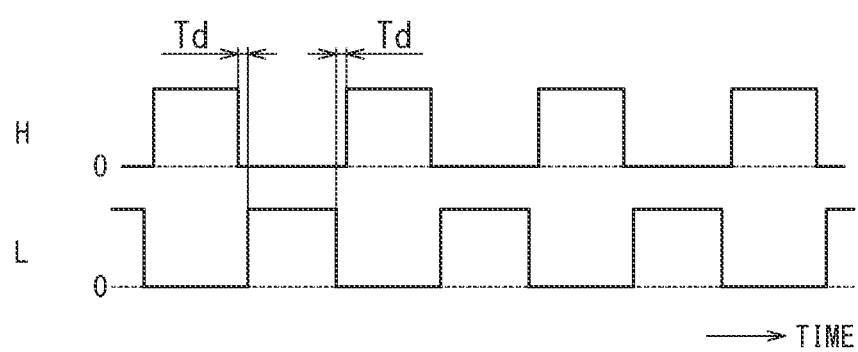

In the case of a step-down voltage converter 14, as shown in FIGS. 3B and 12B, the duty of the gate signal supplied to the high-side switching device 44H is changed, while keeping the gate signal supplied to the low-side switching device 44L at the low level. In the case of a step-up/step-down voltage converter 14, as shown in FIGS. 3C and 12C, the duties of the gate signals supplied to the high-side and low-side switching devices 44H, 44L are changed. However, it should be noted that, with a step-up/step-down voltage converter 14, dead times Td are set between the two gate signals so as not to simultaneously turn on the two switching devices 44H, 44L.

In FIG. 11A corresponding to the conceptual diagram of FIG. 6A, as in the case of FIG. 10B, while increasing the step-up ratio from Tru2 to Tru2*r*, a load current IL1 corresponding to the load requirement is caused to flow in such a manner that the absolute value of the discharge current Id does not exceed the discharge current maximum value Idmax. In this case, too, it is possible to equalize the voltages or SOCs between the two batteries 12, while supplying the load current IL1 and charging current Ic (Ic1).

In FIG. 11B corresponding to the conceptual diagrams of FIGS. 6B and 9, the load requirement becomes larger than in FIG. 11A and a flow of larger load current IL2 (>IL1) is required, in which case the absolute value of the discharge current Id may exceed the discharge current maximum value Idmax. In this case, the duties of the gate signals supplied to the switching devices 44H, 44L of the discharging-side voltage converter 14 are varied to vary the transformation ratio Tr (e.g. step-up ratio Tru) from Tru1 to Tru1*r* (<Tru1). This reduces the voltage difference between the secondary sides 32 of the two voltage converters 14 to reduce the charging current Ic (Ic2). As the charging current Ic is reduced, the load current IL2 flowing to the load 26 can be increased, so that the voltages or SOCs of the two batteries 12 can be equalized while sending the load current IL2 corresponding to the load requirement.

FIG. 13 is a timing chart illustrating current variations of four batteries 12 by time series during an operation to equalize the voltages or SOCs of the four batteries 12. In FIG. 13, the vertical axis indicates current, where the current on the positive side of zero illustrates operation in which a discharge current Id flows from the battery 12 and the current on the negative side of zero illustrates operation in which a charging current Ic flows into the battery 12.

In the time period from time t0 to time t1, current flows from a discharging battery 1 to charged batteries 2 to 4. In the time period from time t1 to time t2, the battery 2 switches from the charged side to discharging side, and current flows from the batteries 1 and 2 to the batteries 3 and 4. In the time period from time t2 to time t3, the battery 3 switches from the charged side to discharging side, and current flows from the batteries 1 to 3 to the battery 4. After time t3, the voltages or SOCs of the batteries 1 to 4 have been equalized and the charging and discharging operation of the batteries 1 to 4 ends.

In this way, while sending current from discharging batteries 12 to charged batteries 12, the plurality of batteries 12 sequentially switch from the charged side to discharging side as time passes. As a result, the voltages or SOCs can be equalized quickly.

<5.6 Description of Specific Operations of Equalization of Voltages or SOCs>

Next, specific processes to equalize the voltages or SOCs in the power supply systems 10 of FIGS. 1 to 3C will be described referring to the flowcharts of FIGS. 14 to 16. The description using FIGS. 14 to 16 will also refer to FIGS. 1 to 13 when necessary.

FIG. 14 is a flowchart of a process performed by the power supply system 10 of FIG. 1. The process of FIG. 14 is conducted chiefly by the control unit 24 and the voltage converters 14 of FIG. 1.

In step S1, the control unit 24 sets the transformation ratios Tr of the plurality of voltage converters 14 to initial values in order to set the value of currents flowing in the power supply system 10 to zero. The table 36 previously stores the initial values of the transformation ratios Tr of the individual voltage converters 14. For example, if the step-down ratio Trd of the voltage converter 14 connected to the battery 12 having the lowest voltage is 1, then the step-down ratios Trd of the individual voltage converters 14 are represented by equation (2) below.

$$Trd = \text{(voltage value of lowest-voltage battery 12)} / \text{(voltage value of battery 12 connected to voltage converter 14)} \quad (2)$$

The control unit 24 refers to the table 36 and sets command values corresponding to the initial values and sends them to the individual voltage converters 14. Then, based on the command value received, each voltage converter 14 sets the transformation ratio Tr to the initial value. As a result, the currents flowing in the power supply system 10 become zero, which suppresses deterioration of the batteries 12.

In next step S2, in order to start the operation to equalize the voltages or SOCs of the plurality of batteries 12, the control unit 24 determines transformation ratios Tr for the plurality of voltage converters 14 so as to cause current to flow from discharging battery or batteries 12 to charged battery or batteries 12, and sets command values corresponding to the transformation ratios Tr thus determined. The control unit 24 then sends the set command values to the individual voltage converters 14.

On the basis of the command value received, each voltage converter 14 adjusts the transformation ratio Tr. Then, each voltage converter 14 converts the voltage of the battery 12 connected thereto according to the transformation ratio Tr, and outputs the converted voltage to the secondary side 32. As a result, a discharge current Id flows from a discharging battery 12 through the voltage converter 14, and a charging current Ic flows into a charged battery 12 through the voltage converter 14.

In this step S2, if, as shown in FIGS. 5, 6A and 9, the electric power is distributed with the highest-voltage battery 12 functioning as a discharging battery 12 and the remaining batteries 12 being batteries 12 to be charged, the step-down ratios Trd of the voltage converters 14 connected to the remaining batteries 12 is made lower than the step-down ratio Trd of the voltage converter 14 connected to the highest-voltage battery 12. Further, in this step S2, if, as shown in FIG. 6B, the electric power is distributed with the lowest-voltage battery 12 being a battery 12 to be charged and the remaining batteries 12 functioning as discharging batteries 12, the step-down ratio Trd of the voltage converter 14 connected to the lowest-voltage battery 12 is made lower.

In next step S3, each primary-side current measuring device 16 measures the current flowing on the primary side 30 (discharge current Id or charging current Ic) and sends the measurement to the control unit 24. In this step S3, each primary-side voltage measuring device 18 may measure the voltage on the primary side 30, the secondary-side current measuring device 20 may measure the current on the secondary side 32, and the secondary-side voltage measuring device 22 may measure the voltage on the secondary side 32. These measurements are also sent to the control unit 24.

In next step S4, based on the received current measurements on the primary sides 30, the control unit 24 determines whether there is any voltage converter 14 providing a discharge current Id whose absolute value exceeds the discharge current maximum value Idmax, among the voltage converter(s) 14 supplying discharge current(s) Id. If there is any voltage converter 14 supplying a discharge current Id whose |Id| is larger than Idmax (|Id|>Idmax, step S4: YES), then the process moves to step S5.

In step S5, the control unit 24 determines that the battery 12 supplying the discharge current Id with |Id|>Idmax may deteriorate, and changes the transformation ratio Tr of the voltage converter 14 connected to this battery 12 so as to lower the voltage on the secondary side 32. Specifically, the control unit 24 changes the command value so as to lower the transformation ratio Tr (e.g. step-down ratio Trd) and sends it to this voltage converter 14. Then, based on the command value received, this voltage converter 14 adjusts the transformation ratio Tr to be lower. As a result, the voltage on the secondary side 32 becomes lower and hence the discharge current Id becomes smaller, whereby the absolute value of the discharge current Id can be equal to or less than the discharge current maximum value Idmax to suppress deterioration of the battery 12 connected to the voltage converter 14.

If a negative determination result is obtained in step S4 (step S4: NO), i.e., if no battery 12 is supplying a discharge current Id whose |Id| is larger than Idmax (|Id|>Idmax), then the process skips step S5 and moves to step S6.

In step S6 after step S4 or S5, based on the received current measurements on the primary sides 30, the control unit 24 determines whether there is any voltage converter 14 receiving a charging current Ic whose absolute value exceeds the charging current maximum value Icmax, among the voltage converter(s) 14 receiving charging current(s) Ic. If there is any voltage converter 14 receiving a charging current Ic whose |Ic| is larger than Icmax (|Ic|>Icmax, step S6: YES), the process moves to step S7.

In step S7, the control unit 24 determines that the battery 12 receiving the charging current Ic with |Ic|>Icmax may deteriorate, and changes the transformation ratio Tr of the voltage converter 14 connected to this battery 12 so as to raise the voltage on the secondary side 32. That is, the control unit 24 changes the command value so as to increase the transformation ratio Tr (e.g. step-down ratio Trd) and sends it to this voltage converter 14.

Then, based on the command value received, this voltage converter 14 adjusts the transformation ratio Tr to be higher. As a result, the voltage on the secondary side 32 increases and hence the charging current Ic becomes smaller, whereby the absolute value of the charging current Ic can be equal to or less than the charging current maximum value Icmax to suppress deterioration of the battery 12 connected to the voltage converter 14.

If a negative determination result is obtained also in step S6 (step S6: NO), i.e., if no battery 12 is receiving a charging current Ic whose |Ic| is larger than Icmax (|Ic|>Icmax), then the process skips step S7 and moves to step S8.

In step S8 after step S6 or S7, the control unit 24 determines whether the voltages or SOCs of the individual batteries 12 are within a given threshold range (second range). The second range is a voltage range or SOC range within which the voltages or SOCs of the individual batteries 12 are regarded as having been equalized.

If the voltages or SOCs of the individual batteries 12 are not within the second range (step S8: NO), then the control unit 24 determines that the equalization of the voltages or SOCs of the individual batteries 12 has not been completed and returns to step S2. Thus, the operations of steps S2 to S7 are repeatedly executed until the equalization of the voltages or SOCs of the individual batteries 12 has been completed (step S8: YES).

On the other hand, if the voltages or SOCs of the individual batteries 12 are within the second range (step S8: YES), the process moves to step S9. In step S9, the control unit 24 sets command values to set the transformation ratios Tr of the individual voltage converters 14 (e.g., step-down ratios Trd) to 1, and sends the set command values to the individual voltage converters 14. Then, based on the command value received, each voltage converter 14 adjusts the transformation ratio Tr to 1. Specifically, each voltage converter 14 stops the converting operation and makes the positive terminal 30p on the primary side 30 and the positive terminal 32p on the secondary side 32 conduct to each other. As a result, it is possible to connect the plurality of batteries 12 having equalized voltage values or SOCs in parallel in the conducting state.

FIG. 15 is a flowchart of a process performed by the power supply system 10 of FIG. 2 (first modification). The process of FIG. 15 is conducted chiefly by the voltage converters 14 of FIG. 2.

In the power supply system 10 of FIG. 2, each battery unit 38 includes the primary-side voltage measuring device 18. Accordingly, in step S11, each primary-side voltage measuring device 18 measures the voltage of the battery 12 and outputs the measurement to the voltage converter 14 within the battery unit 38. Further, each primary-side voltage measuring device 18 sends the measurement also to the voltage converters 14 of the other battery units 38.

In step S12, based on the measurements received, each voltage converter 14 sets its own transformation ratio Tr (e.g., step-down ratio Trd) according to the lowest-voltage battery 12. That is, each voltage converter 14 sets the step-down ratio Trd using equation (3) below.

$$Trd = \text{(voltage value of lowest-voltage battery 12)} / \text{(voltage value of battery 12 of its own battery unit 38)} \quad (3)$$

In step S13, each primary-side current measuring device 16 measures the current flowing on the primary side 30 and outputs the measurement to the voltage converter 14 within the battery unit 38. Each primary-side current measuring device 16 sends the measurement also to the voltage converters 14 of the other battery units 38.

Here, the lowest-voltage battery 12 has a voltage or SOC that is lower than those of the other batteries 12, and so needs charging. Accordingly, in step S14, the voltage converter 14 connected to the lowest-voltage battery 12 adjusts the transformation ratio Tr so that the charging current Ic becomes the charging current maximum value Icmax. In this way, the battery 12 of its battery unit 38 is a battery 12 to be charged, while the batteries 12 of the other battery units 38 function as discharging batteries 12, so that the charging current Ic preferentially flows into this battery 12.

In next step S15, each voltage converter 14 determines whether the absolute value of the discharge current Id exceeds the discharge current maximum value Idmax, based on the measurement sent from the primary-side current measuring device 16 of its own battery unit 38.

If |Id|>Idmax (step S15: YES), then, in next step S16, the voltage converter 14 determines that the battery 12 of its own battery unit 38 may deteriorate, and changes the transformation ratio Tr so as to lower the voltage on the secondary side 32. For example, the voltage converter 14 lowers the step-down ratio Trd to lower the voltage on the secondary side 32, to thereby make the discharge current Id smaller. Thus, the absolute value of the discharge current Id becomes equal to or less than the discharge current maximum value Idmax, which suppresses deterioration of the battery 12.

If |Id|≤Idmax in step S15 (step S15: NO), the process skips step S16 and moves to step S17.

In step S17 after step S15 or S16, each voltage converter 14 determines whether the absolute value of the charging current Ic exceeds the charging current maximum value Icmax, based on the measurement sent from the primary-side current measuring device 16 of its own battery unit 38.

If |Ic|>Icmax (step S17: YES), then, in next step S18, the voltage converter 14 determines that the battery 12 of its own battery unit 38 may deteriorate and changes the transformation ratio Tr so as to raise the voltage on the secondary side 32. For example, the voltage converter 14 raises the step-down ratio Trd to increase the voltage on the secondary side 32, to thereby make the charging current Ic smaller. Thus, the absolute value of the charging current Ic becomes equal to or less than the charging current maximum value Icmax, which suppresses deterioration of the battery 12.

If |Ic|≤Icmax in step S17 (step S17: NO), the process skips step S18 and moves to step S19.

In step S19 after step S17 or S18, each voltage converter 14 determines whether the voltage or SOC of the battery 12 of each battery unit 38 is within the second range. If the voltage or SOC of even one of the batteries 12 is not within the second range (step S19: NO), then each voltage converter 14 determines that the equalization of the voltages or SOCs of the individual batteries 12 has not been completed and returns to step S12. Thus, the operations of steps S12 to S18 are repeatedly executed until the equalization of the voltages or SOCs of the individual batteries 12 has been completed (step S19: YES).

On the other hand, if the voltages or SOCs of the individual batteries 12 are within the second range (step S19: YES), then, in next step S20, each voltage converter 14 sets the transformation ratio Tr (step-down ratio Trd) to zero and stops the converting operation, and makes the positive terminal 30p on the primary side 30 and the positive terminal 32p on the secondary side 32 conduct to each other.

FIG. 16 is a flowchart of another process performed by the power supply system 10 of FIG. 1 or 2 (second modification). Here, a description will be given on a process for equalizing voltages or SOCs of a plurality of batteries 12, with the lowest-voltage battery 12 being a battery 12 to be charged, while adjusting the transformation ratios Tr (e.g. step-down ratios Trd) according to the voltage value of this battery 12. The process will be described using the power supply system 10 of FIG. 1, but the same applies in the same way also to the power supply system 10 of FIG. 2.

In step S21, each primary-side voltage measuring device 18 measures the voltage of the battery 12 and sends the measurement to the control unit 24.

In step S22, on the basis of the measurements received, the control unit 24 sets the transformation ratio Tr (e.g. step-down ratio Trd) of each voltage converter 14 according to the lowest-voltage battery 12. That is, the control unit 24 sets the step-down ratios Trd using equation (4) below.

$$Trd = \text{(voltage value of lowest-voltage battery 12)}/\text{(voltage value of battery 12 connected to voltage converter 14)} \quad (4)$$

Then, the control unit 24 sends command values based on the set transformation ratios Tr to the individual voltage converters 14. On the basis of the command value received, each voltage converter 14 adjusts the transformation ratio Tr.

In step S23, each primary-side current measuring device 16 measures the current flowing on the primary side 30 and sends the measurement to the control unit 24.

In step S24, on the basis of the measurements received, the control unit 24 sets the transformation ratios Tr for the individual voltage converters 14 so that a charging current Ic corresponding to the charging current maximum value Icmax flows into the lowest-voltage battery 12. The control unit 24 then sends the command values based on the set transformation ratios Tr to the individual voltage converters 14. Based on the command value received, each voltage converter 14 adjusts the transformation ratio Tr. For example, the control unit 24 gradually raises the transformation ratios Tr while monitoring the currents measured by the primary-side current measuring devices 16 for the plurality of voltage converters 14, and fixes the transformation ratios Tr of the individual voltage converters 14 when the charging current Ic corresponding to the charging current maximum value Icmax flows into the lowest-voltage battery 12.

In next step S25, each primary-side current measuring device 16 measures the current on the primary side 30 and sends the measurement to the control unit 24. Further, each primary-side voltage measuring device 18 measures the voltage of the battery 12 and sends the measurement to the control unit 24. Further, the secondary-side current measuring device 20 measures the load current IL and sends the measurement to the control unit 24. Furthermore, the secondary-side voltage measuring device 22 measures the voltage on the secondary side 32 and sends the measurement to the control unit 24.

In next step S26, on the basis of the measurements received, the control unit 24 determines whether a regenerative current has flown from the load 26 to the side of the voltage converters 14, or whether there is any battery 12 whose |Id| is larger than Idmax (|Id|>Idmax). If a regenerative current flows, or if |Id|>Idmax (step S26: YES), then the process moves to next step S27.

In step S27, if a regenerative current flows, the control unit 24 determines that the lowest-voltage battery 12 may deteriorate because the regenerative current flows into this battery 12 in addition to the charging current maximum value Icmax. Further, if |Id|>Idmax, then the control unit 24 determines that the discharging battery 12 may deteriorate.

Next, the control unit 24 sets the transformation ratios Tr for all voltage converters 14 according to the voltage value of the lowest-voltage battery 12. The control unit 24 then sends the command values based on the set transformation ratios Tr to the individual voltage converters 14. Then, based on the command value received, each voltage converter 14 adjusts the transformation ratio Tr. As a result, deterioration of the batteries 12 is avoided.

On the other hand, if no regenerative current is flowing from the load 26 to the side of the voltage converters 14, or if |Id|≤Idmax (step S26: NO), the process moves to step S28.

In step S28, the control unit 24 determines that the batteries 12 will not deteriorate, and sets the transformation ratios Tr of the individual voltage converters 14, as in step S24, so that the charging current Ic corresponding to the charging current maximum value Icmax flows into the lowest-voltage battery 12. Then, the control unit 24 sends the command values based on the set transformation ratios Tr to the individual voltage converters 14. Based on the command value received, each voltage converter 14 adjusts the transformation ratio Tr.

In step S29 after step S27 or S28, the control unit 24 determines whether the voltages or SOCs of the individual batteries 12 are within the second range. If the voltage or SOC of even one of the batteries 12 is not within the second range (step S29: NO), the control unit 24 determines that the equalization of the voltages or SOCs of the individual batteries 12 has not been completed and returns to step S25. Thus, the operations of steps S25 to S28 are repeatedly executed until the equalization of the voltages or SOCs of the individual batteries 12 has been completed (step S29: YES).

On the other hand, if the voltages or SOCs of the individual batteries 12 are within the second range (step S29: YES), then, in next step S30, each voltage converter 14 sets the transformation ratio Tr (step-down ratio Trd) to zero and stops the converting operation, and makes the positive terminal 30p on the primary side 30 and the positive terminal 32p on the secondary side 32 conduct to each other.

Now, the flowcharts of FIGS. 14 to 16 have explained operations to charge a battery 12 having a lower voltage or SOC from batteries 12 having higher voltages or SOCs, but the description of the flowcharts can be applied also to operations to supply electric power from the batteries 12 to the load 26. That is, this is because operations are the same irrespective of whether electric power is supplied to a battery 12 to be charged or to the load 26. In this case, the load current IL is sent according to the load requirement, considering that a larger load requirement from the load 26 is equivalent to a battery 12 having a lower voltage or SOC.

[6. Effects of Embodiments]

As has been described above, the power supply system 10 of an embodiment includes: a plurality of batteries 12 that are rechargeable and dischargeable; a plurality of voltage converters 14 having respective primary sides 30 connected respectively to the plurality of batteries 12 and respective secondary sides 32 connected in parallel to each other, wherein each of the plurality of voltage converters 14 is configured to convert the voltage of the battery 12 connected to the primary side 30 thereof at an arbitrary transformation ratio Tr (step-up ratio Tru, step-down ratio Trd) and to output the converted voltage to the secondary side 32; and a plurality of primary-side current measuring devices 16 connected respectively to the primary sides 30 of the plurality of voltage converters 14, and configured to measure currents (discharge current Id, charging current Ic) flowing on the primary sides 30.

In this case, for each of the plurality of voltage converters 14, the transformation ratio Tr is set so that the current measured by the primary-side current measuring device 16 falls within a first range between a discharge current maximum value Idmax of the battery 12 connected to the primary side 30 and a charging current maximum value Icmax of the battery 12.

In this way, if the currents measured by the primary-side current measuring devices 16 are within the first range between the discharge current maximum value Idmax and the charging current maximum value Icmax, current flows automatically (naturally) from a battery 12 having a higher voltage or SOC to a battery 12 having a lower voltage or SOC, and the batteries 12 are thus charged and discharged. On the other hand, if the currents are out of the first range, the transformation ratios Tr are adjusted so that the currents fall within the first range. As a result, it is possible to equalize the voltages or SOCs of the plurality of parallel-connected batteries 12, while avoiding deterioration of the plurality of batteries 12. That is, in the embodiment, charging and discharging operation is performed not while monitoring the voltages or SOCs but using a natural selection method in which a current flows naturally from a battery having a higher voltage or SOC to a battery having a lower voltage or SOC within an allowable current range (first range) of the batteries 12.

In this case, if the absolute value of the discharge current Id flowing from any of the batteries 12 being discharged exceeds the discharge current maximum value Idmax (|Id|>Idmax), the transformation ratio Tr of the voltage converter 14 connected to this battery 12 may be lowered, and if the absolute value of the charging current Ic flowing into any of the batteries 12 being charged exceeds the charging current maximum value Icmax (|Ic|>Icmax), the transformation ratio Tr of the voltage converter 14 connected to this battery 12 may be raised.

Thus, the voltage difference between the secondary sides 32 of the plurality of voltage converters 14 becomes smaller and so the discharge current Id or charging current Ic can fall within the first range. It is thus possible to equalize the voltages or SOCs efficiently and promptly, while avoiding deterioration of the batteries 12.

If the voltages or SOCs of the plurality of batteries 12 are within a second range, each of the plurality of voltage converters 14 may stop the converting operation and make the primary side 30 and the secondary side 32 thereof conduct to each other. This improves the total efficiency of the voltage converters 14 since the switching loss of the switching devices 44H, 44L is eliminated, by the amount of the conversion efficiency of the voltage converters 14.

In this case, when the power supply system 10 stops operating, each of the plurality of voltage converters 14 may terminate the conducting state between the primary side 30 and the secondary side 32 thereof. Then, even if self-discharge of the plurality of batteries 12 occurs or if batteries 12 are replaced after the power supply system 10 stopped, the operation to equalize the voltages or SOCs of the plurality of batteries 12 can be started promptly when the power supply system 10 is restarted.

The transformation ratios Tr may be previously set to initial values allowing the currents to become substantially zero, which makes it possible to reliably avoid deterioration of the plurality of batteries 12.

The power supply system 10 may further include: a plurality of primary-side voltage measuring devices 18 connected respectively to the primary sides 30 of the plurality of voltage converters 14 and configured to measure the voltages on the primary sides 30; and a secondary-side voltage measuring device 22 connected to the secondary sides 32 and configured to measure the voltages on the secondary sides 32. It is then easy to set the transformation ratios Tr of the voltage converters 14 based on the measurements of the primary-side voltage measuring devices 18. Further, it is possible to check if the voltage on the secondary side 32 has changed to a desired voltage value after the transformation ratios Tr were adjusted.

Further, at least one of the plurality of batteries 12 may be attachable to and removable from the power supply system 10. Then, the embodiment can be easily applied to the power supply system 10 using attachable and removable batteries 12. For example, when the batteries 12 are general-purpose battery packs, and the plurality of batteries 12 are connected in parallel through voltage converters 14, the voltages or SOCs of all battery packs can be equalized automatically and quickly just by replacing only some of the battery packs with fully recharged battery packs, without the need to replace all battery packs at the same time. That is, battery packs having lower voltages or SOCs can be charged automatically from the fully recharged battery packs.

Furthermore, one of the batteries 12, the voltage converter 14 connected to this battery 12, and the primary-side current measuring device 16 connected to the primary side 30 of this voltage converter 14 may constitute one battery unit 38, and the power supply system 10 may include a plurality of the battery units 38, wherein at least one of the battery units 38 may be attachable to and removable from the power supply system 10. In this case, too, the embodiment can be applied easily to the power supply system 10 using removable battery units 38.

The present invention is not limited to the embodiments described above but can adopt various configurations based on the description of the specification.

What is claim is:

1. A power supply system comprising:
   a plurality of batteries that are rechargeable and dischargeable;
   a plurality of voltage converters each having a primary side connected to one of the plurality of batteries, the plurality of voltage converters having respective secondary sides connected in parallel to each other, each of the plurality of voltage converters being configured to convert a voltage of the battery connected to the primary side thereof at an arbitrary transformation ratio and to output the converted voltage to the secondary side; and
   a plurality of current measuring devices connected respectively to the primary sides of the plurality of voltage converters, and configured to measure currents flowing on the primary sides,
   wherein, for each of the plurality of voltage converters, the transformation ratio is set so that the current measured by the current measuring device connected to the primary side falls within a first range between a discharge current maximum value of the battery connected to the primary side and a charging current maximum value of the battery, and
   wherein the transformation ratio is previously set to an initial value allowing the current to become substantially zero.

2. A power supply system comprising:
   a plurality of batteries that are rechargeable and dischargeable;
   a plurality of voltage converters each having a primary side connected to one of the plurality of batteries, the plurality of voltage converters having respective secondary sides connected in parallel to each other, each of the plurality of voltage converters being configured to convert a voltage of the battery connected to the primary side thereof at an arbitrary transformation ratio and to output the converted voltage to the secondary side; and
   a plurality of current measuring devices connected respectively to the primary sides of the plurality of voltage converters, and configured to measure currents flowing on the primary sides,
   wherein, for each of the plurality of voltage converters, the transformation ratio is set so that the current measured by the current measuring device connected to the primary side falls within a first range between a discharge current maximum value of the battery connected to the primary side and a charging current maximum value of the battery,
   if an absolute value of a current flowing from any of the batteries being discharged exceeds the discharge current maximum value, the transformation ratio of the voltage converter connected to this battery is lowered, and
   if an absolute value of a current flowing into any of the batteries being charged exceeds the charging current maximum value, the transformation ratio of the voltage converter connected to this battery is raised.

3. A power supply system comprising:
   a plurality of batteries that are rechargeable and dischargeable;
   a plurality of voltage converters each having a primary side connected to one of the plurality of batteries, the plurality of voltage converters having respective secondary sides connected in parallel to each other, each of the plurality of voltage converters being configured to convert a voltage of the battery connected to the primary side thereof at an arbitrary transformation ratio and to output the converted voltage to the secondary side; and
   a plurality of current measuring devices connected respectively to the primary sides of the plurality of voltage converters, and configured to measure currents flowing on the primary sides,
   wherein, for each of the plurality of voltage converters, the transformation ratio is set so that the current measured by the current measuring device connected to the primary side falls within a first range between a discharge current maximum value of the battery connected to the primary side and a charging current maximum value of the battery,
   wherein, if voltages or SOCs of the plurality of batteries are within a second range, each of the plurality of voltage converters stops a converting operation and makes the primary side and the secondary side thereof conduct to each other.

4. The power supply system according to claim 3, wherein, when the power supply system stops operating, each of the plurality of voltage converters terminates a conducting state between the primary side and the secondary side thereof.

5. The power supply system according to claim 1, further comprising:
   a plurality of primary-side voltage measuring devices connected respectively to the primary sides of the plurality of voltage converters and configured to measure the voltages on the primary sides; and
   a secondary-side voltage measuring device connected to the secondary sides and configured to measure the voltages on the secondary sides.

6. The power supply system according to claim 1, wherein at least one of the plurality of batteries is attachable to and removable from the power supply system.

7. The power supply system according to claim 6, wherein one of the plurality of batteries, the voltage converter connected to this battery, and the current measuring device connected to the primary side of this voltage converter constitute one unit, and the power supply system comprises a plurality of the units, and at least one of the units is attachable to and removable from the power supply system.

* * * * *